US007429715B2

(12) United States Patent
MacKenzie et al.

(10) Patent No.: US 7,429,715 B2
(45) Date of Patent: Sep. 30, 2008

(54) MODULAR PLASMA ARC TORCH

(75) Inventors: Darrin H. MacKenzie, Windsor, VT (US); Shiyu Chen, Claremont, NH (US); Roger W. Hewett, Plainfield, NH (US); Kevin D. Horner-Richardson, Cornish, NH (US); Joseph P. Jones, Lebanon, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 1312 days.

(21) Appl. No.: 10/083,194

(22) Filed: Feb. 26, 2002

(65) Prior Publication Data

US 2003/0160032 A1 Aug. 28, 2003

(51) Int. Cl.
*B23K 10/00* (2006.01)

(52) U.S. Cl. ............................ 219/121.5; 219/121.51; 219/121.55; 219/75

(58) Field of Classification Search ............ 219/121.48, 219/121.36, 121.5, 121.51, 121.53, 121.54, 219/121.57, 74, 75
See application file for complete search history.

(56) References Cited

U.S. PATENT DOCUMENTS

| | | | | |
|---|---|---|---|---|
| 3,629,547 A | | 12/1971 | Kesler et al. | 219/130 |
| 5,074,802 A | * | 12/1991 | Gratziani et al. | 439/192 |
| 5,083,818 A | | 1/1992 | Schoot | |
| 5,132,513 A | | 7/1992 | Ingwersen et al. | |
| 5,258,599 A | * | 11/1993 | Moerke | 219/121.48 |
| 5,260,546 A | | 11/1993 | Ingwersen et al. | |
| 5,338,917 A | | 8/1994 | Stuart et al. | |
| 5,844,197 A | * | 12/1998 | Daniel | 219/121.57 |
| 5,874,707 A | | 2/1999 | Iida et al. | 219/121.48 |
| 6,163,008 A | * | 12/2000 | Roberts et al. | 219/121.48 |
| 6,227,846 B1 | | 5/2001 | Zagoroff | 431/345 |

* cited by examiner

*Primary Examiner*—Mark Paschall
(74) *Attorney, Agent, or Firm*—Brinks Hofer Gilson & Lione

(57) ABSTRACT

A modular plasma arc torch is provided that comprises a torch head and a torch lead, and a quick disconnect that is operatively engaged between the torch head and the torch lead. Accordingly, the torch head and torch lead may be quickly assembled and disassembled through the use of the quick disconnect. Further, the modular plasma arc torch also comprises a gas control device disposed within the plasma arc torch, which is operatively engaged between the torch head and the torch lead through the use of the quick disconnect according to the present invention. In addition, the quick disconnect may be used to connect a wide range of torch components within a plasma arc torch, thereby providing a reconfigurable plasma arc torch. Moreover, the quick disconnect according to the present invention conducts both gas and electric power from a power supply to the torch head for operation of the plasma arc torch.

82 Claims, 13 Drawing Sheets

MODULAR PLASMA ARC TORCH

FIELD OF THE INVENTION

The present invention relates generally to plasma arc torches and more particularly to devices and methods for assembling and disassembling torch components such as a torch head and a torch lead within the plasma arc torch.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. A typical manual plasma arc torch generally includes a torch head comprising nonremovable components (e.g., anode, cathode), and removable components, commonly referred to as consumables, along with a torch handle that houses or covers at least a portion of the torch head and other torch components. The torch handle also houses at least a portion of a torch lead, which generally provides a conduit for the supply of both gas and electric power to the torch head for operation of the plasma arc torch. Further, the torch handle is preferably constructed of an insulating material and is designed to allow a user to conveniently handle and operate the plasma arc torch.

An upper portion of the torch head typically includes a torch body or housing in which the nonremovable components such a cathode, an insulating body, and an anode are positioned, whereas a lower portion of the torch head is typically configured to accommodate the removable consumable components. Generally, consumable components have a much shorter life than other components of a plasma arc torch and are thus replaced on a more regular basis. The consumable components may include, by way of example, an electrode, a torch tip (or nozzle), a gas distributor, and a shield cup. Further, the consumable components are typically releasably attached or connected to the torch body and/or to the nonremovable components within the torch body, thereby allowing the consumable components to be easily replaced on a regular basis.

Additionally, the upper portion of the torch head is typically connected to the torch lead within the handle of the plasma arc torch, wherein such a connection is typically fixed rather than releasable as with the consumable components. Occasionally, the fixed connection between the torch head and the torch lead must be broken if a new torch head or a new torch lead is required. For example, if a torch lead is damaged and requires replacement, the lead is replaced in its entirety by removing a series of connections and fittings, such as electrical wires and compression fittings, and reattaching a new torch lead through the same set of connections and fittings. With plasma arc torches of the known art, however, replacing the torch lead or the torch head is relatively time-consuming and rather cumbersome.

Alternately, the entire torch lead and the torch head assembly may be replaced rather than replacing the torch lead or torch head separately. Although replacing the entire assembly is more time efficient, the associated cost is much higher than replacing an individual torch head or torch lead. Therefore, a tradeoff exists between replacing individual components at a lower cost but with more time, and replacing an entire torch assembly at a higher cost but in less time.

Additionally, known plasma arc torches generally include specific components that are designed for a specific set of performance requirements such as a torch head, a trigger, and a torch lead, among others, which together comprise a torch assembly for the specific set of performance requirements. Such components are further secured within the torch as previously described, which results in a plasma arc torch that is not easily reconfigurable to meet a different set of performance requirements. For example, if a different power supply were being used, either an entirely different plasma arc torch would be required, or a different torch components would have to be replaced within the torch, which is time consuming and cumbersome as previously described.

Accordingly, a need remains in the art for a device and method that allows for quick and efficient replacement of torch components within a plasma arc torch, yet which is relatively low cost. A further need exists for such a device and method that is also capable of conducting both gas and electric power for operation of the plasma arc torch and which is also relatively compact so as to not interfere with operation of the plasma arc torch. Yet a further need exists for a reconfigurable plasma arc torch and associated methods of assembly and disassembly.

SUMMARY OF THE INVENTION

In one preferred form, the present invention provides a modular plasma arc torch comprising a torch head, a torch lead, and a quick disconnect operatively engaged between the torch head and the torch lead such that the torch head and torch lead may be quickly assembled and disassembled. Generally, the quick disconnect comprises a pin fitting that is engaged within a socket adapter such that both gas and electric power for operation of the plasma arc torch are conducted through the quick disconnect. The pin fitting further comprises a plurality of resilient fingers with contact flanges at a proximal end thereof, and the socket adapter further comprises an insulative socket housing with a conductive socket fitting disposed therein. Accordingly, the contact flanges engage the socket fitting to provide electrical contact for supply of the electric power, while the socket housing insulates the area surrounding the quick disconnect during use and operation of the plasma arc torch.

As used herein, a plasma arc apparatus, whether operated manually or automated, shall be construed by those skilled in the art to be an apparatus that generates or uses plasma for cutting, welding, spraying, gouging, or marking operations, among others. Accordingly, the specific reference to plasma arc cutting torches or plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention.

In another form, the present invention provides a modular plasma arc torch comprising a torch head, a gas control device, and a torch lead. Similarly, a quick disconnect is operatively engaged between the torch head and the gas control device and also between the gas control device and the torch lead. Accordingly, torch components within the plasma arc torch, e.g., torch head, gas control device, torch lead, may be quickly assembled and disassembled.

In other forms of the present invention, a torch head, a torch lead, and a gas control device are provided that comprise a quick disconnect member disposed within an end thereof, wherein the quick disconnect members conduct gas and electric power for operation of a plasma arc torch while allowing the torch head, the torch lead, and the gas control device to be quickly assembled and disassembled from within the plasma arc torch.

In yet another form, a quick disconnect for operable engagement of components that conduct both gas and electric power, not necessarily specific to a plasma arc torch, is provided that comprises a pin fitting engaged within a socket adapter as previously set forth. Similarly, the pin fitting comprises a plurality of resilient fingers with contact flanges and the socket adapter comprises a conductive socket fitting disposed within an insulative socket housing. Accordingly, the contact flanges engage the socket fitting to provide electrical contact for supply of the electric power.

Further, a modular plasma arc torch is provided that comprises a plurality of torch components operatively connected through a corresponding plurality of quick disconnects. Moreover, alternate quick disconnects other than the pin fitting and socket adapter are provided in other forms of the present invention. In yet another form, a modular plasma arc torch handle is provided, wherein two handle halves may be quickly assembled and disassembled, thereby contributing to the overall modularity of the plasma arc torch.

Additionally, the present invention provides methods of assembling and disassembling a plasma arc torch, wherein the quick disconnect members as previously described are placed in and removed from engagement with corresponding quick disconnect members of torch components disposed within the plasma arc torch. Thus, the plasma arc torch may be quickly assembled and disassembled for purposes such as replacement or repair, or for production assembly and disassembly, among others.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
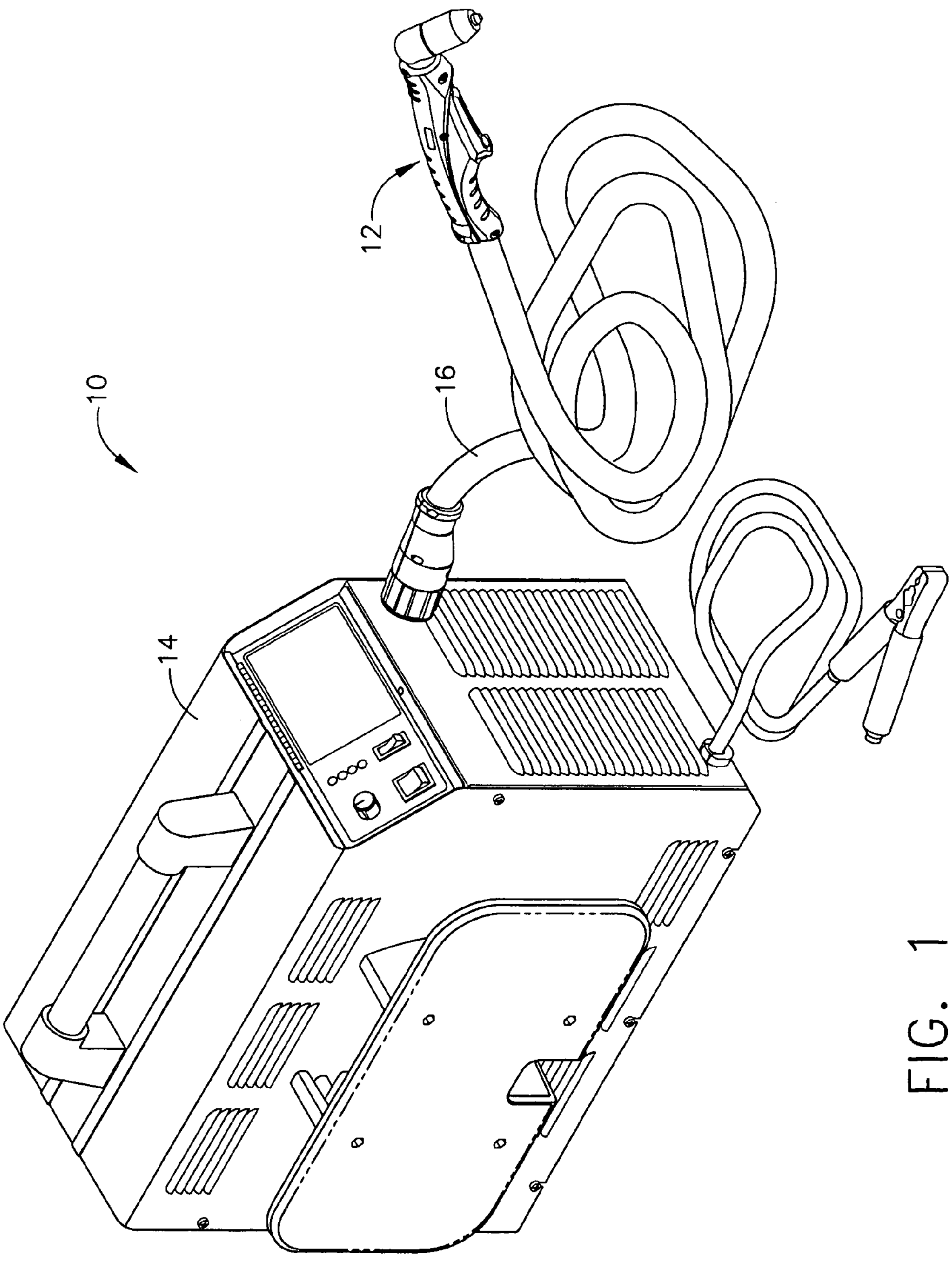
FIG. 1 is a perspective view of a manually operated plasma arc apparatus constructed in accordance with the principles of the present invention.

Referring to the drawings, a modular plasma arc torch according to the present invention is generally operable with a manually operated plasma arc apparatus as indicated by reference numeral 10 in FIG. 1. Typically, the manually operated plasma arc apparatus 10 comprises a plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12. Additionally, electric power as used herein should be construed as comprising not only the main power or current for generation of a plasma arc, but also power for other electrical functions such as signal pins or a pilot return that control additional torch functions, among others used within plasma arc torches.

Figure 2:
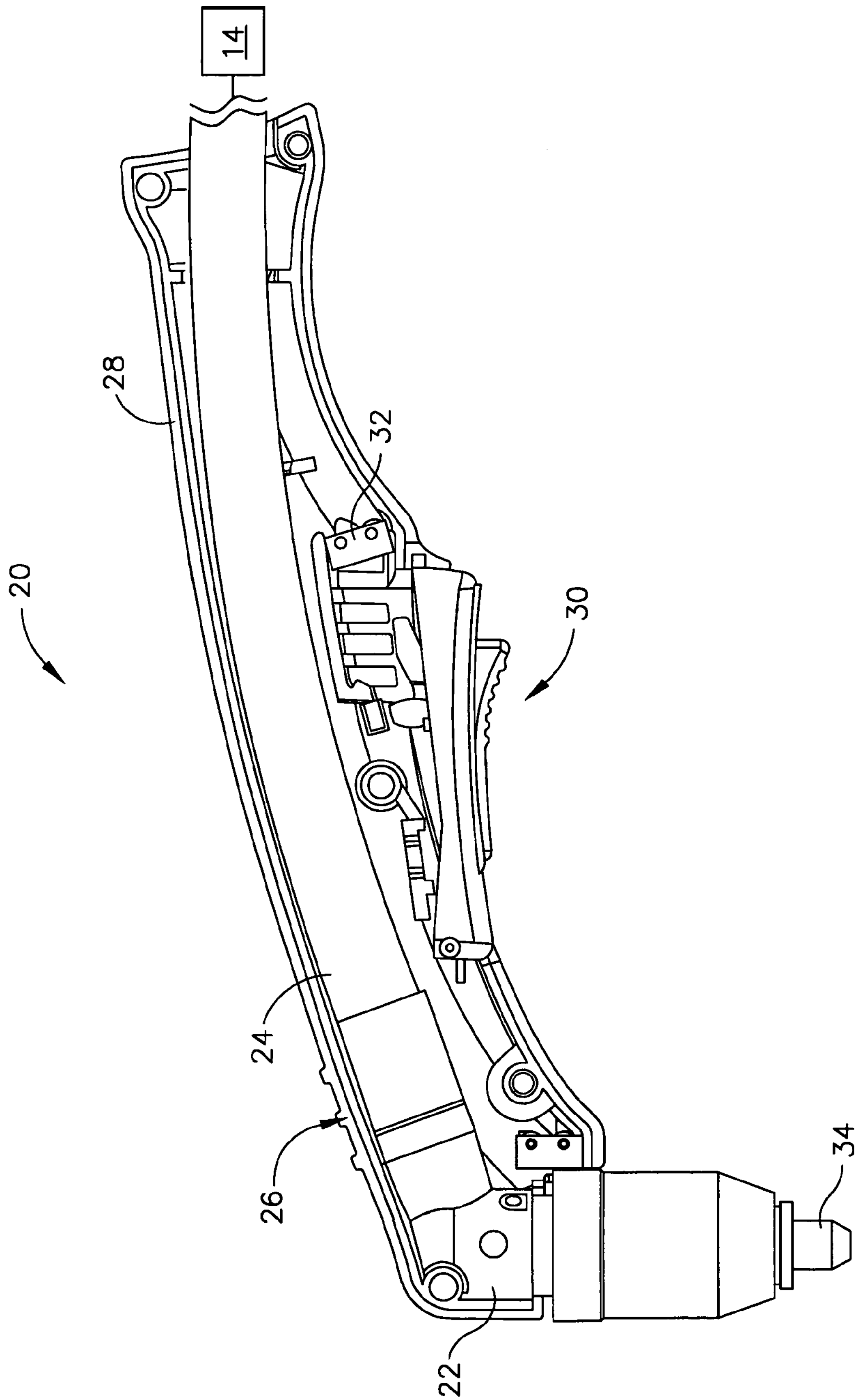
FIG. 2 is a side view of a torch head and a torch lead operatively engaged through a quick disconnect within a plasma arc torch and constructed in accordance with the principles of the present invention.

Referring now to FIG. 2, a modular plasma arc torch according to one embodiment of the present invention is illustrated and generally indicated by reference numeral 20. As shown, the modular plasma arc torch 20 comprises a torch head 22, a torch lead 24, and a quick disconnect 26 operatively engaged between the torch head 22 and the torch lead 24. Accordingly, the torch head 22 is removably connected to the torch lead 24 through the quick disconnect 26, which is described in greater detail below, such that the torch head 22 and the torch lead 24 may be quickly assembled and disassembled. As further shown, the torch components, e.g., torch head 22 and torch lead 24, are disposed within a torch handle 28, one half of which is removed for clarity.

In operation, both gas and electric power are supplied to the torch head 22 through activation of a trigger system 30. Generally, the trigger system 30 causes a power switch 32 disposed within the torch handle 28 to activate the supply of gas and electric power. Alternately, the trigger system 30 may activate the supply of gas with a gas control device (not shown) disposed within the torch handle 28, which is further described below. Operation of the trigger system 30 is described in greater detail in copending application titled "Plasma Arc Torch Trigger System," filed Feb. 26, 2002, and commonly assigned with the present application, the contents of which are incorporated herein by reference.

The power switch 32 is in electrical communication with the power supply 14 (shown schematically), which generates and supplies gas and electric power. Accordingly, both gas and electric power are delivered from the power supply 14, through the torch lead 24, and to the torch head 22 for generation of a plasma arc and a subsequent plasma stream that is ejected from a torch tip 34. Therefore, the quick disconnect 26 according to the present invention must be capable of conducting both gas and electric power for operation of the modular plasma arc torch 20. Furthermore, as used herein, the terms proximal or proximal direction should be construed as meaning towards or in the direction of the power supply 14, and the terms distal or distal direction should be construed as meaning towards or in the direction of the tip 34 of the plasma arc torch 12.

Figure 3:
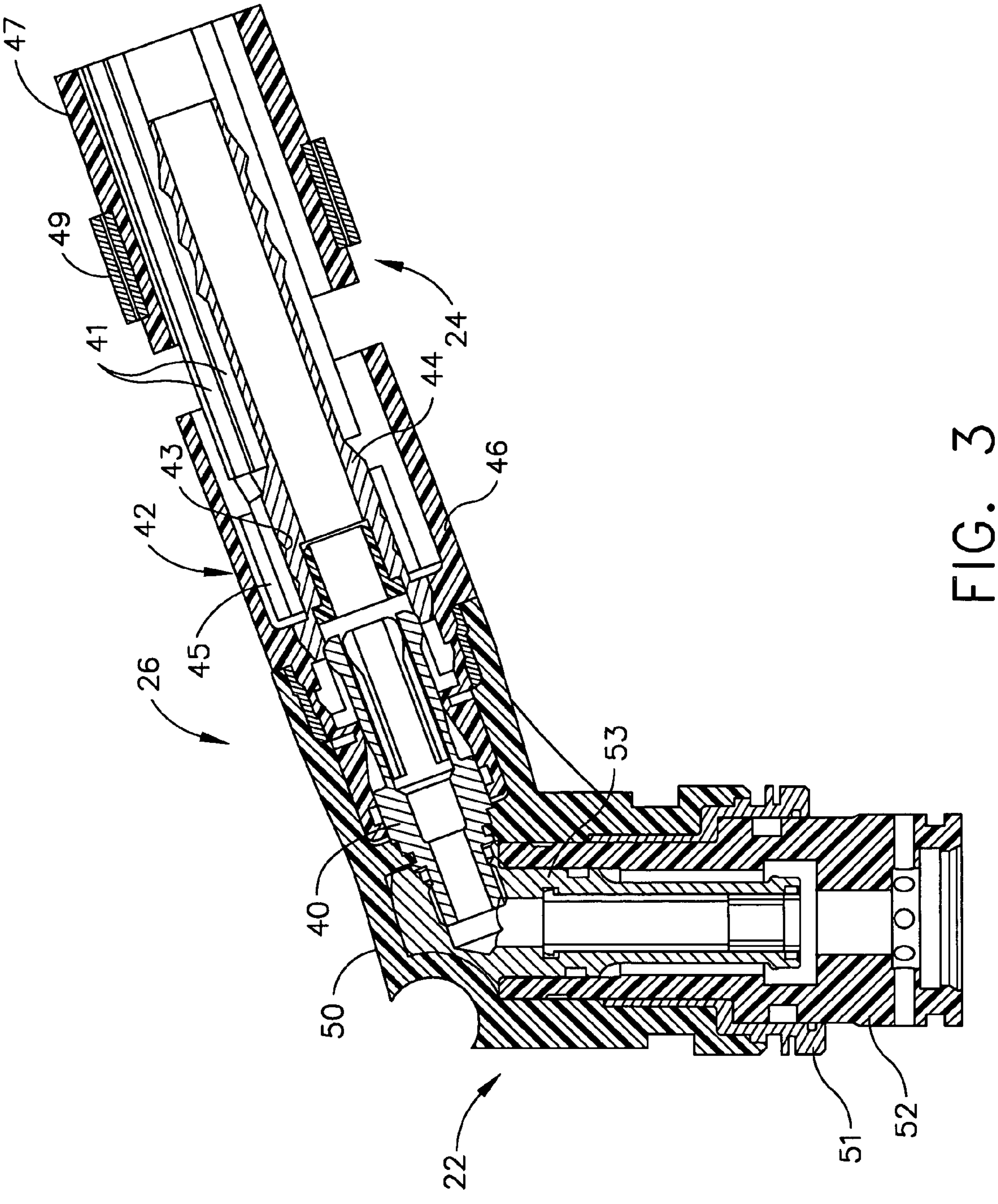
FIG. 3 is a cross-sectional view of a quick disconnect, taken through the plane of FIG. 2, operatively engaged between a torch head and a torch lead within a plasma arc torch and constructed in accordance with the principles of the present invention.

With reference to FIG. 3, the quick disconnect 26 according to one form of the present invention is shown operatively engaged between the torch head 22 and the torch lead 24. As shown, the quick disconnect 26 comprises a conductive pin fitting 40 engaged within a socket adapter 42, the operation of which is described in greater detail below. Further, the socket adapter 42 comprises a conductive socket fitting 44, which is engaged by the pin fitting 40, and which is disposed with an insulative socket housing 46. Additionally, individual wires 41, which are preferably used for main cutting current power, are crimped over grooves 43 defined on the socket fitting 44 with a collar 45 to provide electrical continuity between the wires 41 and the socket fitting 44. Moreover, an insulative sheath 47 is crimped over the wires 41 with a ring 49 to encase and protect the wires 41 from the surrounding environment.

As further shown, the torch head 22 comprises an insulative housing 50, in which an anode 51 (positive side of the power supply), an insulator body 52, and a cathode 53 (negative side of the power supply) are disposed. In operation, the insulator body 52 insulates the anode 51 from the cathode 53, in addition to performing other gas distribution functions which are described in copending application titled "Contact Start Plasma Arc Torch," filed Feb. 26, 2002, and commonly assigned with the present application, the contents of which are incorporated herein by reference.

Preferably, the pin fitting 40 is molded within the housing 50, although other methods of connecting the pin fitting 40 to the housing 50 such as a threaded connection may also be employed. Additionally, the anode 51, the insulator body 52, and the cathode 53 are similarly molded within the housing 50 in the preferred form of the present invention, although other connection methods such as a threaded connection may also be employed. In one form of the present invention, the anode 51, the insulator body 52, and the cathode 53 as an assembly are operatively connected to the housing 50 using a quick disconnect in accordance with the principles of the present invention, which is described in greater detail below.

Figure 4:
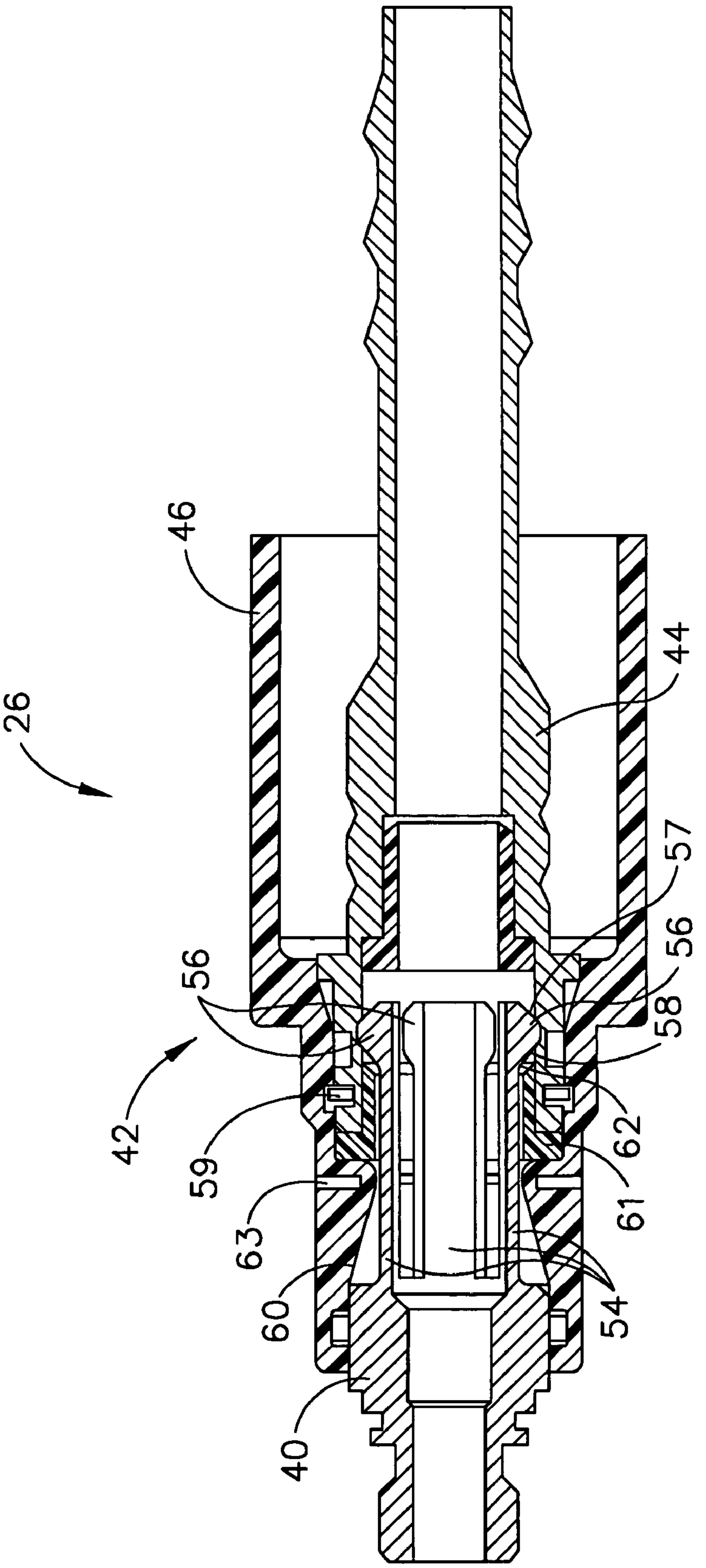
FIG. 4 is a cross-sectional view of a quick disconnect in accordance with the principles of the present invention.

Further details of the quick disconnect 26 are shown in FIG. 4, wherein the pin fitting 40 comprises a plurality of resilient fingers 54 and a plurality of corresponding contact flanges 56 disposed at a proximal end of the resilient fingers 54. As shown, the contact flanges 56 define a dual taper with first tapered surfaces 57 and second tapered surfaces 58, which facilitate engagement and disengagement, respectively, of the quick disconnect 26 as described in further detail below. Preferably, the socket fitting 44 is secured within the socket housing 46 using a snap ring 59 as shown, although other connection methods may be employed, including the connection as shown and described in copending application "Tamperproof Pin Connection," filed Nov. 9, 2001, Ser. No. 10/014,384, which is commonly assigned with the present application and the contents of which are incorporated herein by reference. Accordingly, the socket housing 46 would comprise locking fingers that would engage a collar defined on the socket fitting 44 such that the connection between the socket fitting 44 and the socket housing 46 would be tamperproof.

As further shown, the socket housing 46 defines a tapered internal shoulder 60 that facilitates insertion of the pin fitting 40, and more specifically the resilient fingers 54, into the socket fitting 44. Additionally, the socket fitting 44 further comprises a sleeve 61 disposed therein, defining a tapered surface 62 that facilitates removal of the pin fitting 40. Moreover, the sleeve 61 also limits the contact area between the contact flanges 56 and the socket fitting 44 for proper operation of the quick disconnect 26. Further, the socket housing 46 also defines radial bores 63 that extend from an exterior of the socket housing 46 to a position adjacent the tapered internal shoulder 60. The radial bores 63 are designed to prevent torch malfunction should a rigid object other than the pin fitting 40 with resilient fingers 54 be inadvertently forced into the socket adapter 42, wherein if such an object were forced into the socket housing 46, the radial bores 63 would cause the socket housing 46 to fracture proximate the location of the radial bores 63, thereby causing gas to leak from the socket adapter 42 and reducing the risk of an inappropriate use of the quick disconnect 26 and any possible torch malfunctions that may result.

Figure 5A:
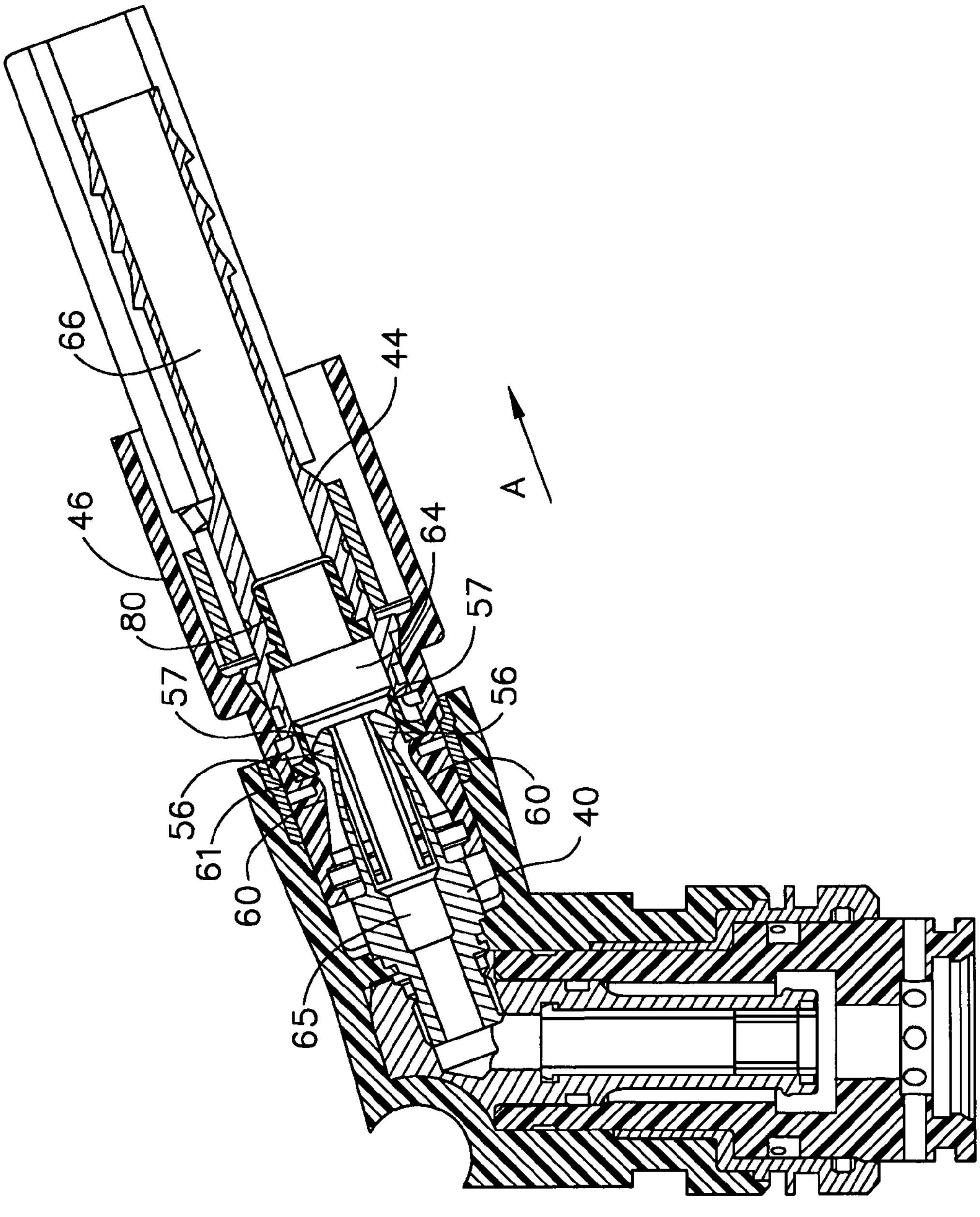
FIG. 5A is a cross-sectional view of a pin fitting engaging a socket adapter for engagement of a quick disconnect in accordance with the principles of the present invention.

Engagement and disengagement of the quick disconnect 26 in accordance with the present invention is illustrated in greater detail in FIGS. 5A (engagement) and 5B (disengagement). As shown in FIG. 5A, as the pin fitting 40 is inserted into the socket housing 46 along the direction of arrow A, first tapered surfaces 57 of the contact flanges 56 abut the tapered internal shoulder 60 defined within the socket housing 46. As the pin fitting 40 is further inserted into the socket housing 46, the tapered internal shoulder 60 causes the resilient fingers 54 to deflect radially inward as shown allowing the pin fitting 40 to be further inserted into the socket housing 42, through the sleeve 61, and into the socket fitting 44. When the contact flanges 56 of the pin fitting 40 pass through the sleeve 61, the resilient fingers 54 deflect back radially outward such that the contact flanges 56 engage a distal internal bore 64 defined within the socket fitting 44. Accordingly, electrical contact is made between the pin fitting 40 and the socket fitting 44.

To further maintain proper contact and to enable engagement and disengagement, an outer diameter of the pin fitting 40 in the area of the contact flanges 56 is larger than an internal diameter of the distal internal bore 64 within the socket fitting 44 such that an engagement force is maintained between the pin fitting 40 and the socket fitting 44 when the contact flanges 56 are disposed within the distal internal bore 64. Additionally, the minimum diameter of the tapered internal shoulder 60, proximate the sleeve 61, is smaller than the outer diameter of the pin fitting 40 in the area of the contact flanges 56 in an undeflected state so that the resilient fingers 54 may be deflected a sufficient amount for insertion into the socket fitting 44.

Figure 5B:
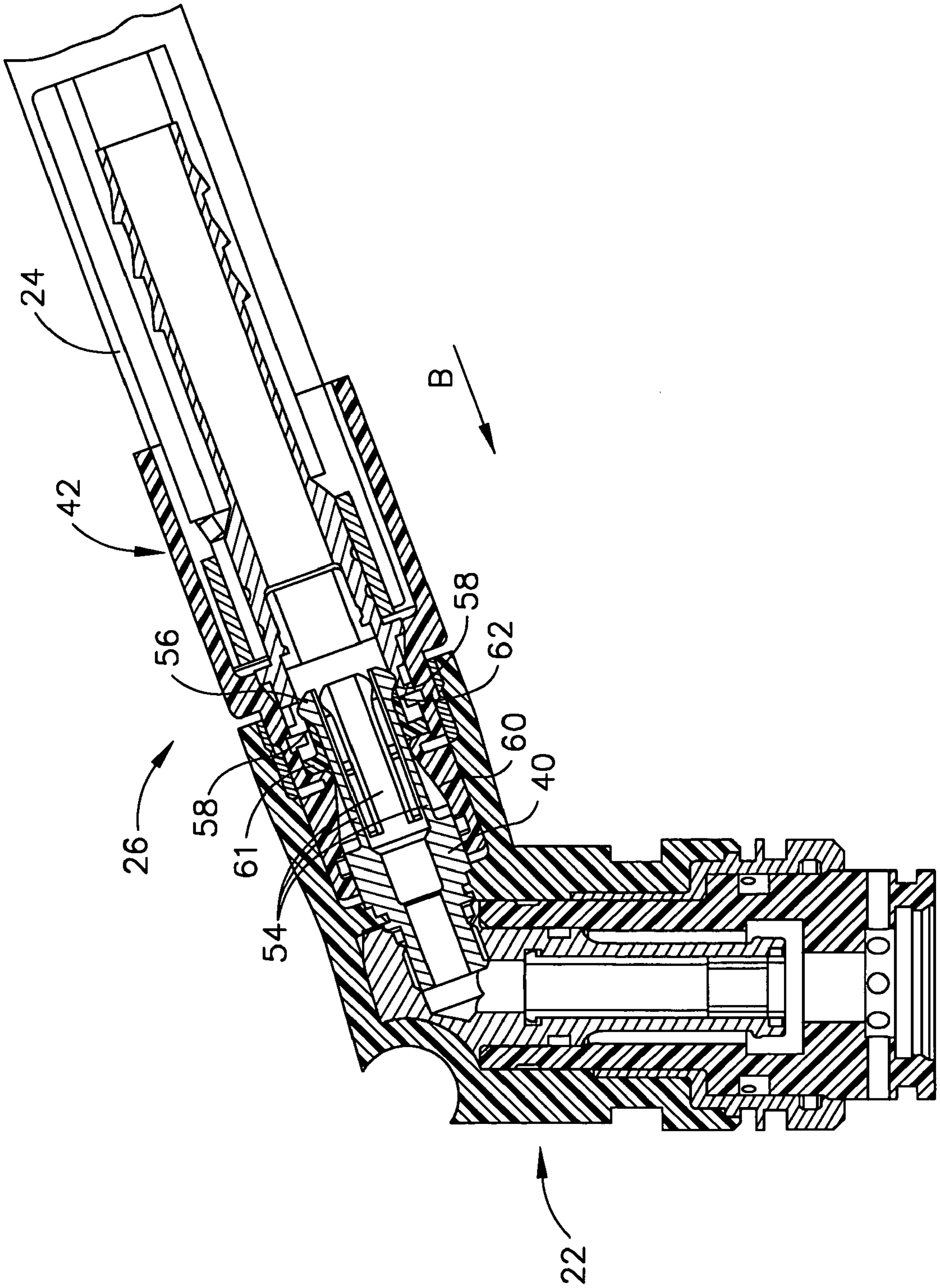
FIG. 5B is a cross-sectional view of a pin fitting disengaging a socket adapter for disengagement of a quick disconnect in accordance with the principles of the present invention.

Referring now to FIG. 5B, the quick disconnect 26 is illustrated during disengagement. As shown, when the pin fitting 40 is removed from the socket adapter 42 along the direction of arrow B, the second tapered surfaces 58 of the resilient fingers 54 engage the tapered surface 62 of the sleeve 61, which causes the resilient fingers 54 to deflect radially inward and the pin fitting 40 may be further removed along the direction of arrow B. After the contact flanges 56 clear the tapered internal shoulder 60, the resilient fingers 54 deflect back radially outward and the pin fitting 40 is disengaged from the socket adapter 42. As a result, the quick disconnect 26 provides a relatively compact and efficient connection between torch components such as the torch head 22 and the torch lead 24, and is further capable of conducting both gas and electric power for operation of the plasma arc torch 12.

For conducting gas flow, the pin fitting 40 defines an internal bore 65 that is in fluid communication with the distal internal bore 64 of the socket fitting 44, and also with a proximal internal bore 66 defined by the socket fitting 44, each of which are sized according to specific gas flow requirements. In operation, the gas flows from the power supply 14 (not shown) through the proximal internal bore 66 of the socket fitting 44, through the distal internal bore 64 of the socket fitting 44, and then through the pin fitting internal bore 65 for subsequent delivery to the torch head 22 (not shown). Accordingly, interfaces between the pin fitting 40 and the socket housing 46, and also between the socket fitting 44 and the socket housing 46, are preferably sealed to inhibit the gas from leaking from the quick disconnect 26. In one form of the present invention, first and second o-rings, 68 and 70 respectively, are disposed at the interfaces such that the first o-ring 68 provides a gas-tight seal between the pin fitting 40 and the socket housing 46, and the second o-ring 70 provides a gas-tight seal between the socket fitting 44 and the socket housing 46. Further, the socket housing 46 comprises an o-ring groove 72 to house the first o-ring 68, and similarly, the socket fitting 44 comprises an o-ring groove 74 to house the o-ring 70, although the o-ring grooves may be disposed in either of the members between which a sealed interface is desired.

For conducting electric power, the pin fitting 40 is in physical contact with the socket fitting 44 as shown, thus the pin fitting 40 and the socket fitting 44 are conductive elements. More specifically, the contact flanges 56 are in physical contact with the distal internal bore 64 of the socket fitting 44 to provide the requisite electrical contact for supply of the electric power from the power supply 14 (not shown) to the torch head 22 (not shown). As further shown, the contact flanges 56 preferably form a rounded profile between the first tapered surfaces 57 and the second tapered surfaces 58 in order to maintain electrical contact should either or both the pin fitting 40 and the socket adapter 42 become misaligned. Additionally, the socket housing 46 is an insulative element such that the area surrounding the quick disconnect 26 is insulated during use and operation. Preferably, the pin fitting 40 and the socket fitting 44 are a heat treated beryllium copper, and the socket housing 46 is a plastic composition such as Nylon or Delrin®.

As further shown, the quick disconnect 26 also comprises a plug 80 disposed on a shoulder 81 formed within the socket fitting 44, between the distal internal bore 64 and the proximal internal bore 66. The plug 80 is comprised of a nonconductive material such that if an object other than the pin fitting 40 with resilient fingers 54 were inadvertently inserted into the socket adapter 42, the plug 80 would inhibit electrical contact between the object and the socket fitting 44. Accordingly, the plug 80 reduces the risk of torch malfunction should an object other than the pin fitting 40 with the resilient fingers 54 be inserted into the socket adapter 42.

Figure 6:
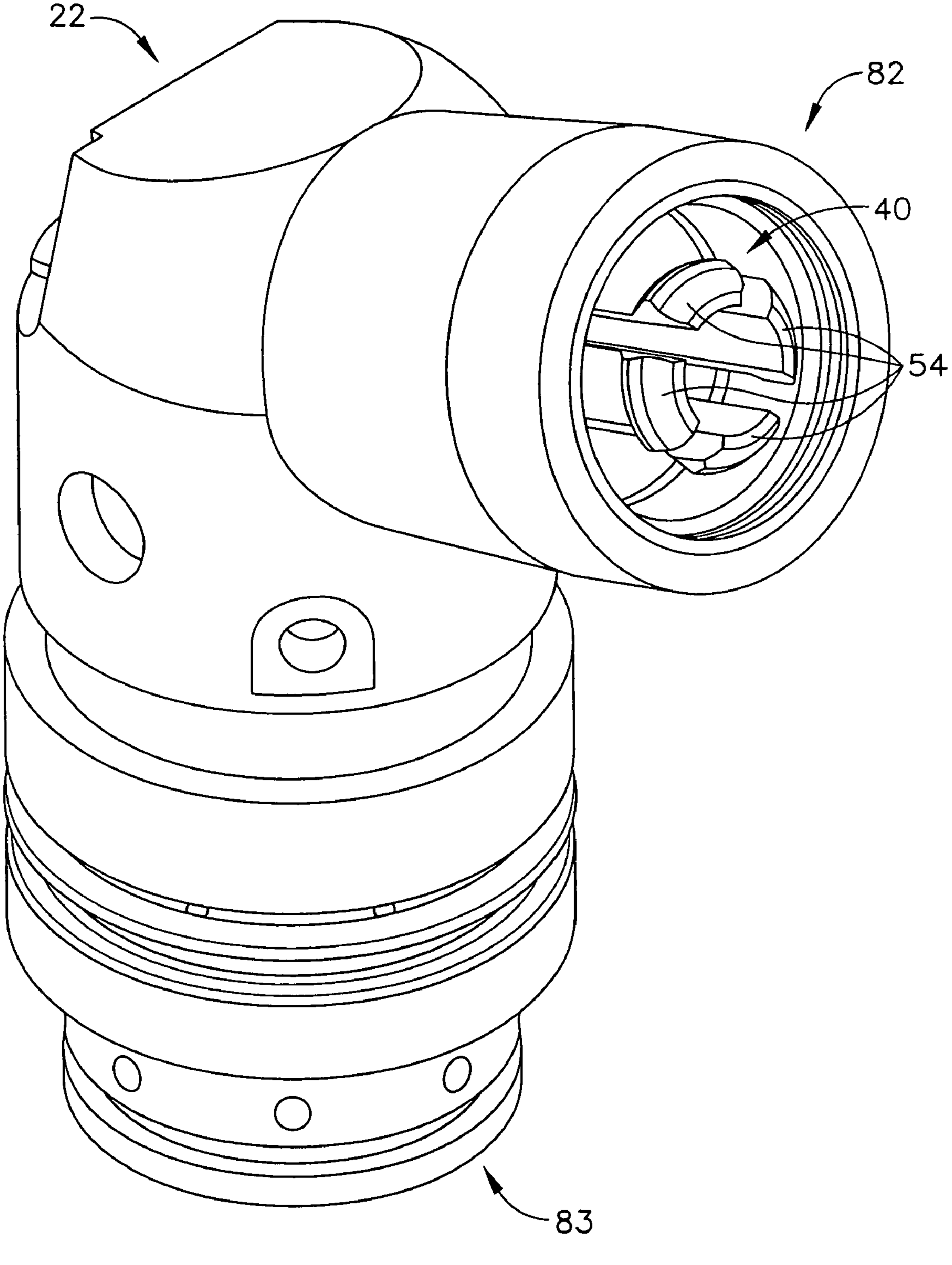
FIG. 6 is a perspective view of a pin fitting of a quick disconnect disposed within a torch head and constructed in accordance with the principles of the present invention.

Referring to FIG. 6, the pin fitting 40 is preferably cylindrical in shape, although other shapes may be employed in accordance with the teachings of the present invention. Preferably, a total of four (4) resilient fingers 54 are employed in the embodiment as illustrated herein, although a different number of resilient fingers 54 may be used according to specific application requirements without departing from the scope of the present invention. Additionally, the pin fitting 40 is illustrated as being disposed within a proximal end 82 of the torch head 22, however, the pin fitting 40 may alternately be disposed within the torch lead 24 (not shown) while the socket adapter 42 (not shown) is disposed within the torch head 22. Therefore, either side of the quick disconnect 26, i.e. plug fitting 40 and socket adapter 42, may be disposed within distal and proximal ends, respectively, of adjoining torch components and remain within the scope of the present invention. In addition to the proximal end 82, the torch head 22 may also comprise a quick disconnect member, i.e. the pin fitting 40 or the socket adapter 42, at a distal end 83 for quickly connecting and disconnecting an anode, insulator body, and cathode assembly (not shown), which is described in greater detail below.

Figure 7:
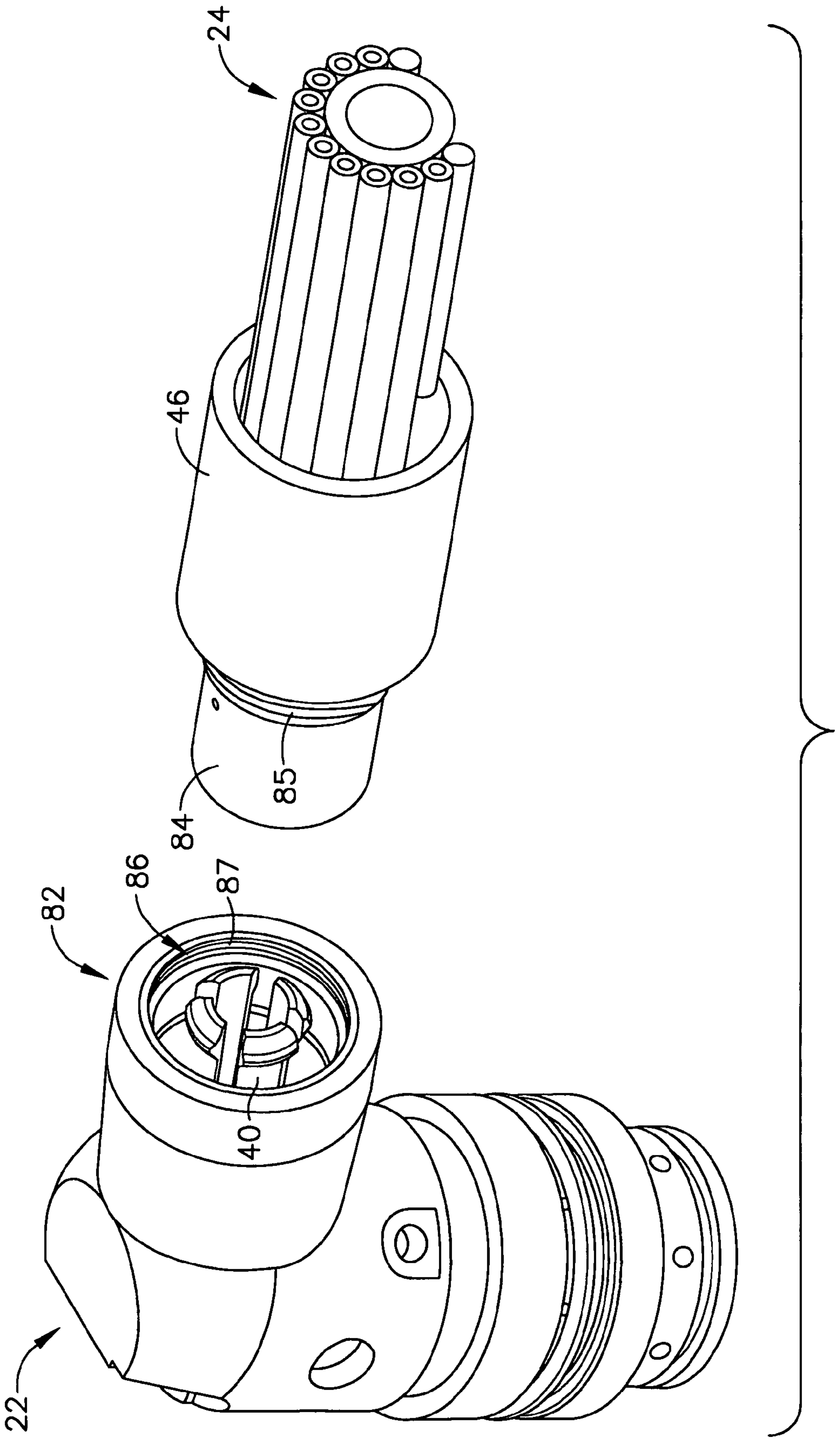
FIG. 7 is an exploded perspective view of a torch head and a torch lead positioned for engagement, illustrating a threaded connection therebetween, and constructed in accordance with the principles of the present invention.

Referring now to FIG. 7, the connection between the torch head 22 and the torch lead 24 may be further secured through a secondary connection, namely, a threaded connection between the torch head 22 and the torch lead 24. The threaded connection is achieved through a threaded extension 84 defined by the socket housing 46 that engages a threaded member 86 disposed within the proximal end 82 of the torch head 22. As shown, the threaded extension 84 defines external threads 85 and extends from the socket housing 46, while the threaded member 86 defines internal threads 87 and is disposed at the proximal end 82 of the torch head 22 proximate the pin fitting 40. After the pin fitting 40 is engaged within the socket adapter 42, the quick disconnect 26 is further secured by threadably engaging the external threads 85 of the threaded extension 84 with the internal threads 87 of the threaded member 86. The threaded connection also provides an additional amount of coaxial translation of the pin fitting 40 relative to the socket adapter 42 so as to further engage and secure the quick disconnect 26. Preferably, the socket housing 46 is rotatably mounted to the socket fitting 44 such that the threaded connection may be engaged without rotating the entire torch lead 24, which could result in an undesirable twisting of the torch lead 24. Accordingly, the snap ring 59 (not shown) as previously described provides the rotatable mounting such that the socket housing 46 may be rotated independently without turning the entire torch lead 24 and the socket adapter 42.

In another form, the threaded connection may further comprise thread protrusions and thread engagement members and as shown and described in copending application titled "Dual Pitch Locking Connector," filed Nov. 9, 2001, and commonly assigned with the present application, the contents of which are incorporated herein by reference in their entirety. Generally, the threaded member 86 comprises two diametrically opposed radial protrusions (not shown) that engage the external threads 85 of the threaded extension 84. Further, the external threads 85 comprise at least one thread protrusion (not shown) such that at least one radial protrusion engages the thread protrusion to provide an audible and tactile indication of a fully mated condition of the quick disconnect 26.

Figure 8:
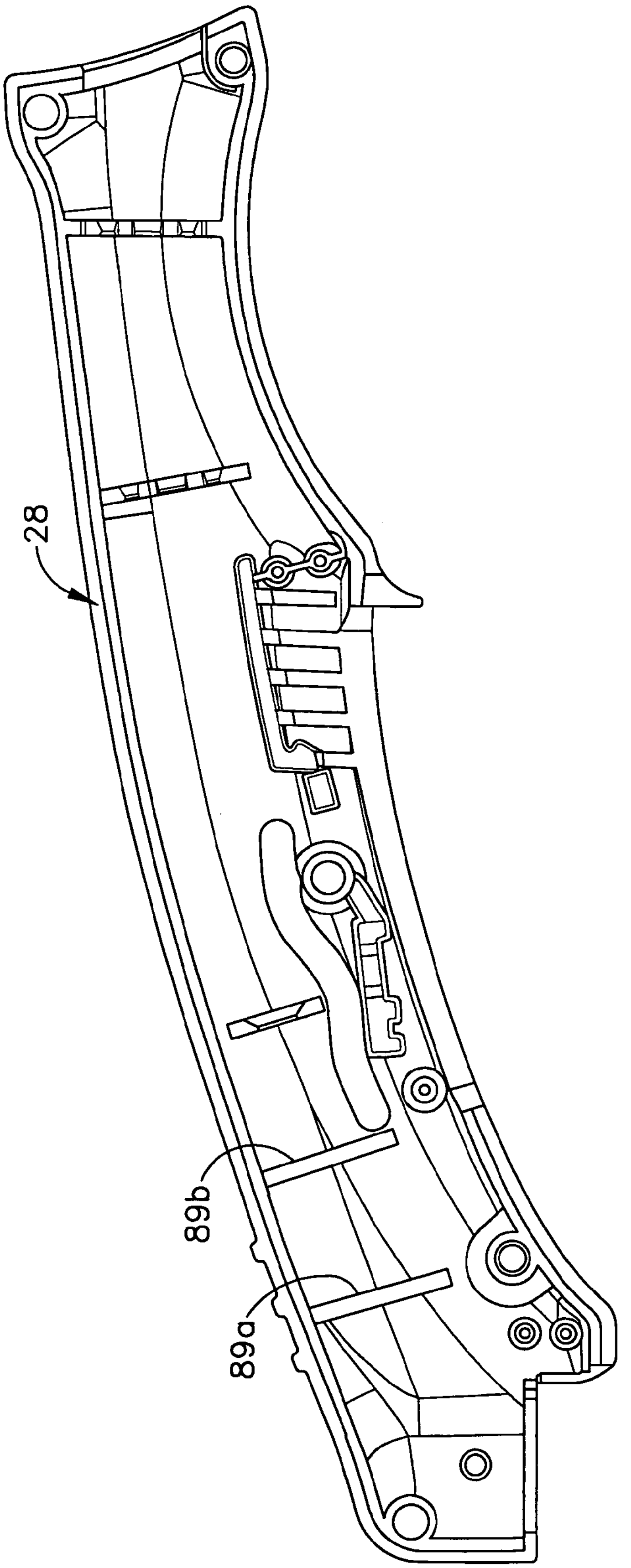
FIG. 8 is a side view of a torch handle comprising positioning ribs to secure torch components therein and constructed in accordance with the principles of the present invention.

As shown in FIG. 8, the connection between the torch head 22 (not shown for clarity) and the torch lead 24 (not shown for clarity) may alternately be further secured through the use of positioning ribs 89 within the torch handle 28, rather than the threaded connection as previously described. After the pin fitting 40 is engaged within the socket adapter 42 as previously described, the torch head 22 and the torch lead 24 are placed within a half of the torch handle 28 between positioning ribs 89*a* and 89*b*, which prevent movement of either the torch head 22 or the torch lead 24 in a direction away from the quick disconnect 26. Accordingly, the positioning ribs 89*a* and 89*b* further secure the connection between the pin fitting 40 and the socket adapter 42. Furthermore, the positioning ribs 89*a* and 89*b* may be disposed in either or both halves of the torch handle 28 and are preferably integrally formed within the torch handle 28, although the positioning ribs 89*a* and 89*b* may alternately be separately attached within the torch handle 28 without departing from the scope of the present invention.

The quick disconnect 26 according to the present invention may also be employed to provide a connection between additional torch components within a plasma arc torch 12 rather than or in addition to between a torch head 22 and a torch lead 24 as previously described. For example, other torch components that may be quickly assembled and disassembled using the quick disconnect 26 according to the present invention may comprise gas flow control components such as valves and orifices, electrical components such as voltage circuits, logic boards, and/or switches, torch head components such as an anode, a cathode, and an insulator, electrical adapters, and torch handles, among others. Accordingly, each component of a plasma arc torch may be easily and rapidly connected and disconnected according to the principles of the present invention, thereby providing a modular plasma arc torch that has not heretofore been observed in plasma arc torches.

Figure 9:
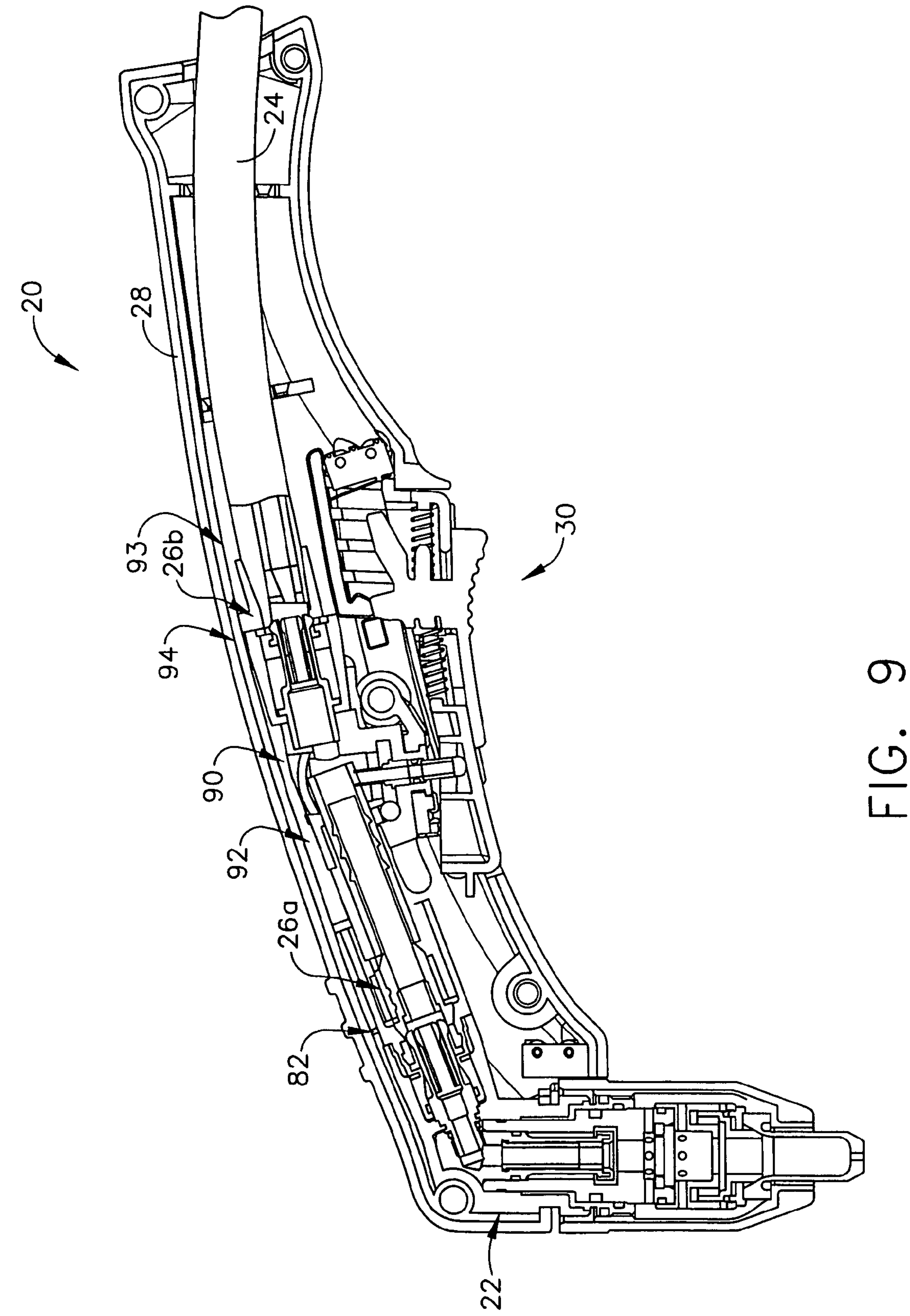
FIG. 9 is a cross-sectional view of a torch head, a gas control device, and a torch lead operatively connected through first and second quick disconnects within a plasma arc torch and constructed in accordance with the principles of the present invention.

As shown in FIG. 9, the quick disconnect 26 is further employed between the torch head 22 and a gas control device 90, (shown as a first quick disconnect 26*a*), and also between the gas control device 90 and the torch lead 24, (shown as a second quick disconnect 26*b*) in another form of the present invention. Generally, the gas control device 90 is employed to provide control of the gas supply local to the torch handle 28 of the plasma arc torch 12 and is activated by the trigger system 30. Additionally, gas control local to the torch handle 28 is disclosed in copending application titled "Torch Handle Gas Control" filed on Feb. 26, 2002, and commonly assigned with the present application, the contents of which are incorporated by reference.

As shown, the gas control device 90 comprises a distal end 92 and a proximal end 94, in which quick disconnect members as previously shown and described are disposed. For example, a socket adapter 42*a* as previously described may be disposed within the distal end 92 of the gas control device 90 as shown, such that a pin fitting 40*a* disposed within the proximal end 82 of the torch head 22 is engaged within the socket adapter 42*a*. Alternately, the socket adapter 42*a* may be disposed at the proximal end 82 of the torch head 22, while the pin fitting 40*a* is disposed within the distal end 92 of the gas control device 90. As further shown, a pin fitting 40*b* is disposed within the proximal end 94 of the gas control device 90, which is engaged within a socket adapter 42*b* disposed within the distal end 93 of the torch lead 24. Alternately, the socket adapter 42*b* may be disposed within the proximal end 94 of the gas control device 90, while the pin fitting 40*b* is disposed within the distal end 93 of the torch lead 24.

Accordingly, the torch head 22 is removably connected to the gas control device 90 through the first quick disconnect 26*a*, and the gas control device 90 is removably connected to the torch lead 24 through the second quick disconnect 26*b* such that the torch head 22, the gas control device 90, and the torch lead 24 may be quickly assembled and disassembled, thereby forming a modular plasma arc torch. Further, both the gas and electric power are conducted through the first quick disconnect 26*a* and the second quick disconnect 26*b* for operation of the plasma arc torch 12. Although the present invention is directed to use of the quick disconnect 26 for a connection between the torch head 22, the gas control device 90, and/or the torch lead 24, the quick disconnect 26 may also be employed with other torch components disposed within the plasma arc torch 12 in accordance with the teachings of the present invention.

Figure 10:
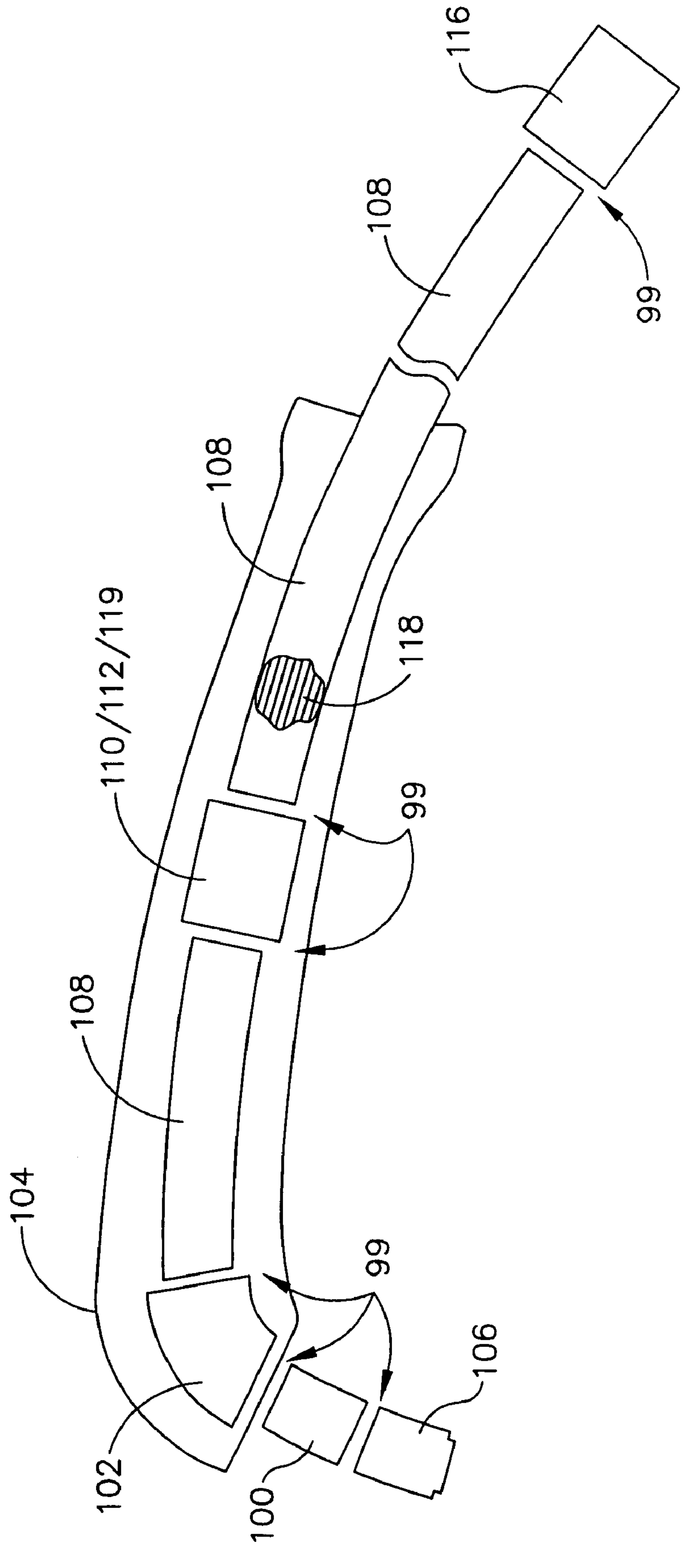
FIG. 10 is a perspective view of a modular plasma arc torch with a plurality of torch components operatively connected with a corresponding plurality of quick disconnects.

For example, FIG. 10 illustrates a plasma arc torch 12 with a plurality of torch components having a quick disconnect 99 operatively engaged between each of the torch components. As shown, the quick disconnect 99 may be employed between a torch head 100 and an adapter 102 within a torch handle 104. As a result, the torch handle 104 does not necessarily require disassembly for replacement of the torch head 100. Further, the quick disconnect 99 may be employed between a cathode, insulator, anode assembly 106 and the torch head 100, between a torch lead 108 and the adapter 102, between a gas flow control component 110 and the torch lead 108, between an electrical component 112 and the torch lead 108, between a proximal end 114 of the torch lead 108 and an adapter 116 for connection to a particular power supply, and between a plurality of signal and power pins 118 and a conductive member 119, among a multitude of other possible combinations of torch components which are too numerous to detail herein. Therefore, it should be understood by those skilled in the art that any number of torch components may incorporate a quick disconnect to provide a modular plasma arc torch that is within the scope of the present invention and the use of specific examples herein should not be construed as limiting the scope of the present invention.

In addition to the quick disconnect 26 as shown and described with the pin fitting 40 and a socket adapter 42, other quick disconnects may also be employed between various torch components as described herein in order to achieve a modular plasma arc torch without departing from the scope of the present invention. For proper operation of the plasma arc torch, however, the quick disconnect that is employed must be capable of conducting both electric power and gas through the quick disconnect and between torch components. For example, the quick disconnect may comprise a dual pitch locking connector as shown and described in copending application titled "Dual Pitch Locking Connector," filed Nov. 9, 2001, Ser. No. 10/035534, which is commonly assigned with the present application and the contents of which are incorporated herein by reference. Alternately, the quick disconnect may comprise a pin and socket configuration wherein resilient fingers are disposed on a socket side of the quick disconnect rather than a pin side, such as on the main power socket as shown and described in copending application titled "Plasma Arc Torch Quick Disconnect," filed Nov. 9, 2001, which is commonly assigned with the present application and the contents of which are incorporated herein by reference.

Figure 11:
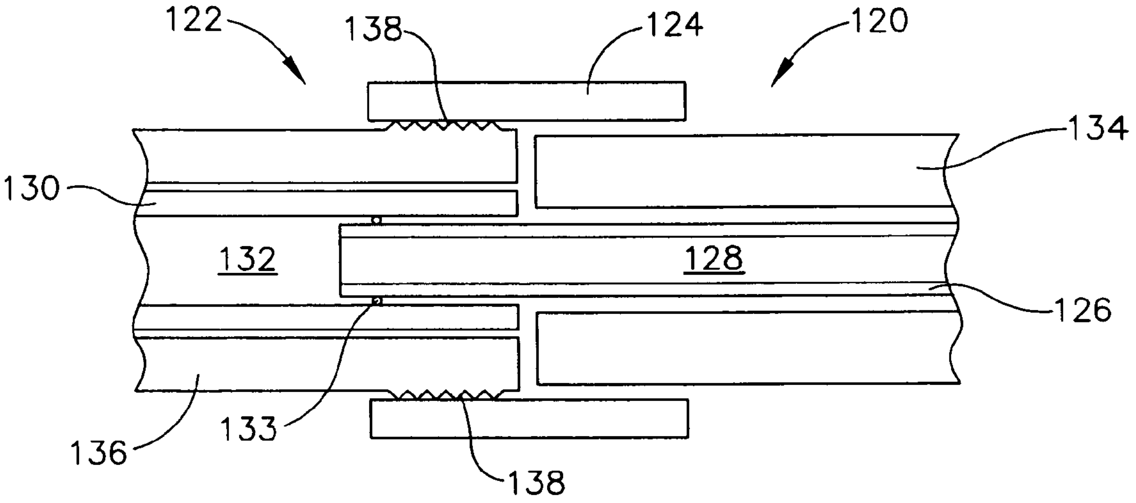
FIG. 11 is a cross-sectional view of another embodiment of a quick disconnect constructed in accordance with the principles of the present invention.

Referring to FIG. 11, the quick disconnect may alternately comprise pin and socket members, 120 and 122 respectively, that are engaged and secured by a locking ring 124. As shown, a conductive pin 126 defining a central bore 128 is engaged within a conductive socket 130, which similarly defines a central bore 132. In operation, a working gas is conducted through the central bores 128 and 132, and electric power is conducted through the conductive pin 126 and the conductive socket 130. Accordingly, an o-ring 133 or other sealing member commonly known in the art is preferably disposed within the quick disconnect as shown to seal the supply of gas. Further, the locking ring 124 secures a pin housing 134 to a socket housing 136 through a threaded connection 138, or through other connection methods commonly known in the art such as a snap-lock or a pin and groove, among others. Accordingly, torch components may be quickly assembled and disassembled through the use of pin and socket members, 120 and 122, in addition to the locking ring 124.

Figure 12:
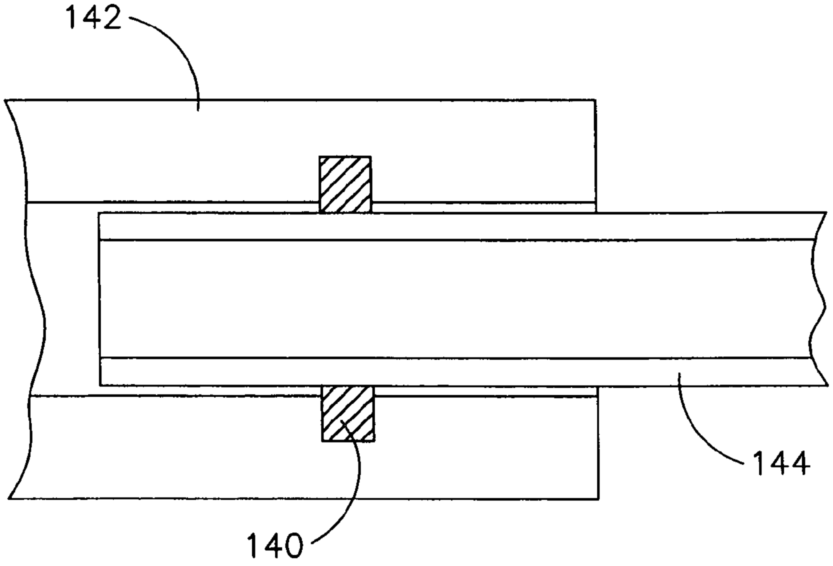
FIG. 12 is a cross-sectional view of yet another embodiment of a quick disconnect employing canted coil springs and constructed in accordance with the principles of the present invention.

As shown in FIG. 12, the quick disconnect may alternately comprise at least one canted coil spring 140 disposed within a socket 142 that engages and secures a pin 144 that is slidably disposed within the socket 142. In operation, the pin 144 is inserted into the socket 142 and compresses the canted coil spring 140 upon engagement such that the canted coil spring 140 applies a radially inward force to secure the pin 144 within the socket 142. Preferably, the canted coil spring 140 is also conductive so as to minimize any loss of electrical continuity across the interface between the pin 144 and the canted coil spring 140. Additionally, a threaded connection may also be employed as previously described to further secure the connection between the pin 144 and the socket 142.

Figure 13:
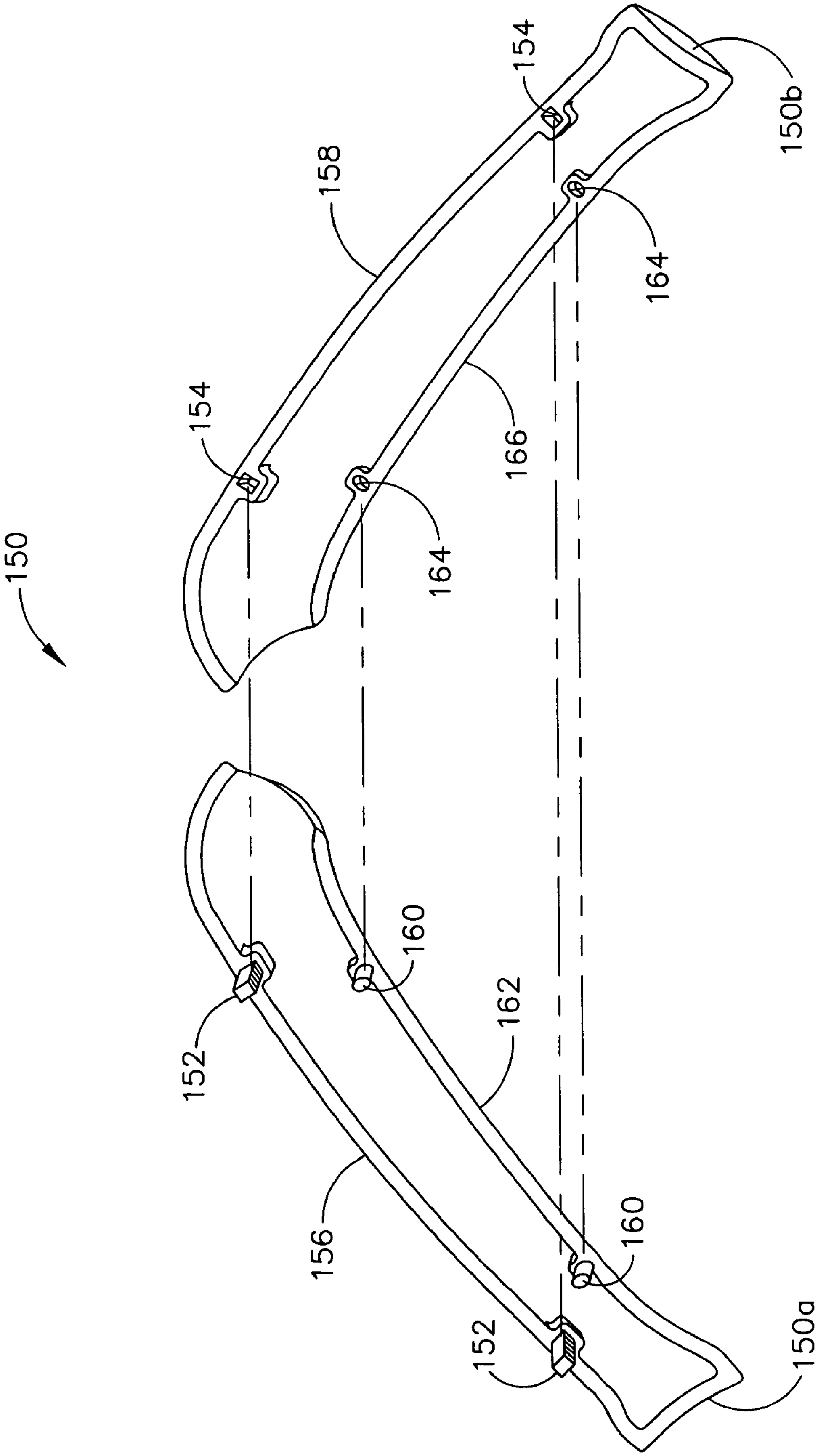
FIG. 13 is a perspective view of a modular plasma arc torch handle constructed in accordance with the principles of the present invention.

Referring now to FIG. 13, yet another form of the modular plasma arc torch is facilitated through the use of a modular torch handle 150. Rather than individual fasteners to secure first and second torch halves **150*a* and 150*b*, respectively, the torch halves 150*a* and 150*b* define flexible tabs 152 and receptacles 154, respectively, in one form of the present invention. As shown, the flexible tabs 152 are disposed along an upper periphery 156 of torch half 150*a* and are preferably integrally molded with the torch half 150*a*. The corresponding set of receptacles 154 are disposed along an upper periphery 158 of the torch half 150*b* and are also preferably integrally molded with the torch half 150*b*. Additionally, the torch half 150*a* defines positioning pins 160 along a lower periphery 162, and the torch half 150*b* defines corresponding positioning holes 164 along a lower periphery 166. Similarly, the positioning pins 160 and the positioning holes 164 are preferably integrally molded with the torch halves 150*a* and 150*b***, respectively.

To quickly assemble the torch halves **150*a* and 150*b*, therefore, the positioning pins 160 are placed within the positioning holes 164 along the lower peripheries 162 and 166, and the upper peripheries 156 and 158 are brought together such that the flexible tabs 152 may be engaged with the receptacles 154. Accordingly, the flexible tabs 152 are depressed while the upper peripheries 156 and 158 are further brought together to engage the receptacles 154 as shown. It should be understood by those skilled in the art that one or a plurality of flexible tabs 152 and corresponding receptacles 154 may be employed without departing from the scope of the present invention. Additionally, the relative position of the flexible tabs 152 and the receptacles 154, in addition to the positioning pins 160 and the positioning holes 164**, along the peripheries may be altered while remaining within the scope of the present invention.

In yet another form of the present invention, a method of assembling the a plasma arc torch with the torch head 22 and torch lead 24 is provided. The method comprises the step of placing a quick disconnect member, (i.e., plug fitting 40 or socket adapter 42), that is disposed within a distal end of the torch lead 24 in engagement with a corresponding quick disconnect member, (i.e., socket adapter 42 or plug fitting 40, respectively), that is disposed within the proximal end 82 of the torch head 22. Accordingly, the torch head 22 and the torch lead 24 are quickly assembled. Further, the method may comprise the step of engaging a threaded member disposed on one of the quick disconnect members with a threaded extension on the corresponding quick disconnect member, such that the torch head 22 is further secured to the torch lead 24.

In another form, the present invention provides a method of assembling a plasma arc torch with the torch head 22, the quick disconnect 90, and the torch lead 24 components. The method comprises the steps of placing a quick disconnect member disposed within a distal end of the torch lead 24 in engagement with a corresponding quick disconnect member disposed within the proximal end 94 of the gas control device 90, and placing a quick disconnect member disposed within the distal end 92 of the gas control device 90 in engagement with a corresponding quick disconnect member disposed within the proximal end 82 of the torch head 22, such that the torch head 22, the torch lead 24, and the gas control device 90 are quickly assembled. Additionally, the method may comprise the step of engaging threaded members disposed on one set of quick disconnect members with threaded extensions on the corresponding quick disconnect members, such that the torch head 22 is further secured to the gas control device 90, and the gas control device 90 is further secured to the torch lead 24.

In yet another form of the present invention, a method of disassembling a plasma arc torch with the torch head 22 and the torch lead 24 disposed therein is provided. The method comprises the step of disengaging a quick disconnect member disposed within a distal end of the torch lead 24 from engagement with a corresponding quick disconnect member disposed within the proximal end 82 of the torch head 22, such that the torch head 22 and the torch lead 24 are quickly disassembled. Similarly, the method may further comprise the step of disengaging a threaded member disposed on one of the quick disconnect members with a threaded extension on the corresponding quick disconnect member prior to disengaging the quick disconnect member disposed within the distal end 93 of the torch lead 24 from engagement with the corresponding quick disconnect member disposed within the proximal end 82 of the torch head 22, such that the torch head 22 is unsecured from the torch lead 24.

Furthermore, a method of disassembling a plasma arc torch with the torch head 22, the gas control device 90, and the torch lead 24 disposed therein is provided. The method comprises the steps of disengaging a quick disconnect member disposed within a distal end of the torch lead 24 from engagement with a corresponding quick disconnect member disposed within the proximal end 94 of the gas control device 90 and disengaging a quick disconnect member disposed within the distal end 92 of the gas control device 90 from engagement with a corresponding quick disconnect member disposed within the proximal end 82 of the torch head 22, such that the torch head 22, the torch lead 24, and the gas control device 90 are quickly disassembled. Additionally, the method may comprise the step of disengaging threaded members disposed on the quick disconnect members from threaded extensions on the corresponding quick disconnect members, such that the torch head 22 is unsecured from the gas control device 90 and the gas control device 90 is unsecured from the torch lead 24 prior to disengaging the quick disconnect members.

Accordingly, the modular plasma arc torch 20 according to the teachings of the present invention provides devices and methods that allow for quick and efficient assembly and disassembly of a wide variety of torch components within a plasma arc torch. Torch components may be easily removed and replaced if damaged, and furthermore, a reconfigurable torch is provided wherein different design functions may be provided by adding or removing torch components, e.g., inserting or removing the gas control valve. Further, the various quick disconnects employed within the modular plasma arc torch 20 are capable of conducting both gas and electric power, and are relatively compact so as to not interfere with operation of the plasma arc torch 12.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A modular plasma arc torch comprising:
a torch head;
a torch lead; and
a quick disconnect operatively engaged between the torch head and the torch lead, the quick disconnect comprising:
a pin fitting; and
a socket adapter,
wherein the pin fitting is engaged within the socket adapter such that gas and electric power are conducted through the quick disconnect,
the pin fitting further comprising a plurality of resilient fingers defining a proximal end and a plurality of contact flanges disposed at the proximal end of the resilient fingers; and the socket adapter further comprising a socket housing and a socket fitting disposed within the socket housing,
wherein the contact flanges engage the socket fitting to provide electrical contact for supply of the electric power, wherein the torch head is removably connected to the torch lead through the quick disconnect such that the torch head and the torch lead may be quickly assembled and disassembled.

2. The modular plasma arc torch according to claim 1, wherein the socket housing further comprises a tapered internal shoulder that causes the resilient fingers to deflect radially inward for engagement of the contact flanges with the socket fitting.

3. The modular plasma arc torch according to claim 2, wherein the socket housing further comprises radial bores disposed adjacent the tapered internal shoulder that cause the socket housing to fracture should an object other than the pin fitting be inadvertently forced into the socket adapter.

4. The modular plasma arc torch according to claim 1, wherein the socket fitting defines a distal internal bore such that the contact flanges engage the distal internal bore for the electrical contact.

5. The modular plasma arc torch according to claim 4, further comprising a sleeve disposed within the distal internal bore to limit engagement of the contact flanges with the distal internal bore and to facilitate disengagement of the pin fitting from the socket adapter.

6. The modular plasma arc torch according to claim 1, further comprising a plug disposed on a shoulder formed within the socket fitting, wherein the plug inhibits electrical contact of an object inadvertently inserted within the socket adapter with the socket fitting.

7. The modular plasma arc torch according to claim 1, further comprising a snap ring disposed around the socket fitting to secure the socket fitting within the socket housing.

8. The modular plasma arc torch according to claim 1, further comprising at least one o-ring disposed between the socket housing and the socket fitting to seal a supply of gas.

9. The modular plasma arc torch according to claim 1, further comprising at least one o-ring disposed between the pin fitting and the socket housing to seal a supply of gas.

10. The modular plasma arc torch according to claim 1, wherein the socket housing further comprises a threaded extension and the torch head further comprises a threaded member, such that when the pin fitting is fully engaged within the socket adapter, the threaded extension threadably engages the threaded member to further secure the torch head to the torch lead.

11. The modular plasma arc torch according to claim 1, further comprising a torch handle defining positioning ribs, wherein the positioning ribs further secure the torch head to the torch lead.

12. The modular plasma arc torch according to claim 1, wherein the pin fitting defines an internal bore and the socket fitting defines a distal internal bore and a proximal internal bore, wherein the pin fitting internal bore, the distal internal bore, and the proximal internal bore are in fluid communication to conduct the gas through the quick disconnect.

13. A modular plasma arc torch comprising:
a torch head;
a gas control device;
a first quick disconnect operatively engaged between the torch head and the gas control device;
a torch lead; and
a second quick disconnect operatively engaged between the gas control device and the torch lead,
wherein the torch head is removably connected to the gas control device through the first quick disconnect and the gas control device is removably connected to the torch lead through the second quick disconnect such that the torch head, the gas control device, and the torch lead may be quickly assembled and disassembled.

14. The modular plasma arc torch according to claim 13, wherein:
the first quick disconnect comprises:
a first pin fitting; and
a first socket adapter; and
the second quick disconnect comprises:
a second pin fitting; and
a second socket adapter,
wherein the first pin fitting is engaged within the first socket adapter, and the second pin fitting is engaged within the second socket adapter, such that gas and electric power are conducted through the first quick disconnect and the second quick disconnect.

15. The modular plasma arc torch according to claim 14, wherein:
the first pin fitting and the second pin fitting further comprise a plurality of resilient fingers defining a proximal end and a plurality of contact flanges disposed at the proximal end of the resilient fingers;
the first socket adapter further comprises a first socket housing and a first socket fitting disposed within the first socket housing; and
the second socket adapter further comprises a second socket housing and a second socket fitting disposed within the second socket housing,
wherein the contact flanges engage the socket fittings to provide electrical contact for supply of the electric power.

16. The modular plasma arc torch according to claim 15, wherein the first and second socket housings further comprise a tapered internal shoulder that causes the resilient fingers to deflect radially inward for engagement of the contact flanges with the socket fittings.

17. The modular plasma arc torch according to claim 16, wherein the socket housings further comprise radial bores disposed adjacent the tapered internal shoulders that cause the socket housings to fracture should objects other than the pin fittings be inadvertently forced into the socket adapters.

18. The modular plasma arc torch according to claim 15, wherein the first and second socket fittings define distal internal bores such that the contact flanges engage the distal internal bores for the electrical contact.

19. The modular plasma arc torch according to claim 18, further comprising first and second sleeves disposed within the distal internal bores to limit engagement of the contact flanges with the distal internal bores and to facilitate disengagement of the pin fittings from the socket adapters.

20. The modular plasma arc torch according to claim 15, further comprising a first plug disposed on a shoulder formed within the first socket fitting, and a second plug disposed on a shoulder formed within the second socket fitting, wherein the plug inhibits electrical contact of objects inadvertently inserted within the socket adapters with the socket fittings.

21. The modular plasma arc torch according to claim 15, further comprising snap rings disposed around the socket fittings to secure the socket fittings within the socket housings.

22. The modular plasma arc torch according to claim 15, further comprising:

a first o-ring disposed between the first socket housing and the first socket fitting; and a second o-ring disposed between the second socket housing and the second socket fitting, wherein the o-rings provide gas-sealed interfaces between the socket housings and the socket fittings.

23. The modular plasma arc torch according to claim 15, further comprising:

a first pin fitting o-ring disposed between the first pin fitting and the first socket housing; and a second pin fitting o-ring disposed between the second pin fitting and the second socket housing, wherein the o-rings provide gas-sealed interfaces between the pin fittings and the socket housings.

24. The modular plasma arc torch according to claim 15, wherein:

the first socket housing further comprises a first threaded extension;

the second socket housing further comprises a second threaded extension;

the torch head further comprises a first threaded member, such that when the first pin fitting is fully engaged within the first socket adapter, the first threaded extension threadably engages the first threaded member to further secure the torch head to the gas control device; and the gas control device further comprises a second threaded member, such that when the second pin fitting is fully engaged within the second socket adapter, the second threaded extension threadably engages the second threaded member to further secure the gas control device to the torch lead.

25. The modular plasma arc torch according to claim 15, further comprising a torch handle defining positioning ribs, wherein the positioning ribs further secure the torch head to the gas control device and the gas control device to the torch lead.

26. The modular plasma arc torch according to claim 15, wherein:

the first and second pin fittings define an internal bore and the first and second socket fittings define a distal internal bore and a proximal internal bore, wherein the first pin fitting internal bore is in fluid communication with the socket fitting internal bores, and the second pin fitting internal bore is in fluid communication with the second socket fitting internal bores to conduct the gas through the quick disconnects.

27. A plasma arc torch head for producing plasma within a plasma arc torch comprising:

a radially deflectable quick disconnect member disposed within a proximal end of the torch head, wherein the quick disconnect member conducts gas and electric power through the plasma arc torch and is operable within a quick disconnect for quickly assembling the plasma arc torch head to and disassembling the plasma arc torch head from a torch component within the plasma arc torch and wherein the plasma arc torch head and the torch component is assembled or disassembled through radial deflection of the quick disconnect member.

28. The plasma arc torch head according to claim 27, wherein the quick disconnect member is a pin fitting comprising a plurality of resilient fingers defining contact flanges to provide electrical contact for supply of the electric power.

29. The plasma arc torch head according to claim 28, wherein the pin fitting further comprises an internal bore to conduct the gas.

30. The plasma arc torch head according to claim 28, further comprising a threaded member disposed adjacent the pin fitting, wherein the threaded member is operable to further secure the plasma arc torch head to the torch component within the plasma arc torch.

31. The plasma arc torch head according to claim 28, wherein the quick disconnect member is a socket adapter comprising a socket housing and a socket fitting disposed within the socket housing, wherein the gas and electric power are conducted through the socket fitting, and the socket housing insulates the socket adapter from a surrounding environment.

32. The plasma arc torch head according to claim 31, wherein the socket housing further comprises a threaded extension that is operable to further secure the plasma arc torch head to the torch component within the plasma arc torch.

33. A plasma arc torch head for producing plasma within a plasma arc torch comprising:

a radially deflectable quick disconnect member disposed within a distal end of the torch head, wherein the quick disconnect member conducts gas and electric power through the plasma arc torch and is operable within a quick disconnect for quickly assembling the plasma arc torch head to and disassembling the plasma arc torch head from a component within the plasma arc torch and wherein the plasma arc torch head and the component is assembled or disassembled through radial deflection of the quick disconnect member.

34. A plasma arc torch lead for delivering gas and electric power to a plasma arc torch comprising:

a quick disconnect member disposed within a distal end of the torch lead, wherein the quick disconnect member conducts gas and electric power through the plasma arc torch and is operable within a quick disconnect for quickly assembling the torch lead to and disassembling the torch lead from a torch component within the plasma arc torch, and wherein the quick disconnect member is a pin fitting comprising a plurality of resilient fingers defining contact flanges to provide electrical contact for supply of the electric power.

35. The plasma arc torch lead according to claim 34, wherein the pin fitting further comprises an internal bore to conduct the gas.

36. The plasma arc torch lead according to claim 34, further comprising a threaded member disposed adjacent the pin fitting, wherein the threaded member is operable to further secure the torch lead to the torch component within the plasma arc torch.

37. The plasma arc torch lead according to claim 34, wherein the quick disconnect member is a socket adapter comprising a socket housing and a socket fitting disposed within the socket housing, wherein the gas and electric rower are conducted through the socket fitting, and the socket housing insulates the socket adapter from a surrounding environment and wherein the socket housing further comprises a threaded extension that is operable to secure the torch lead to the torch component within the plasma arc torch.

38. A gas control device for controlling gas flow to a plasma arc torch comprising:

a first quick disconnect member disposed within a distal end of the gas control device; and a second quick disconnect member disposed within a proximal end of the gas control device, wherein the first quick disconnect member and the second quick disconnect member conduct gas and electric power through the plasma arc torch and are operable within a quick disconnect for quickly assembling the gas control device to and disassembling the gas control device from torch components within the plasma arc torch.

39. The gas control device according to claim 38, wherein:

the first quick disconnect member is a pin fitting comprising a plurality of resilient fingers defining contact flanges to provide electrical contact for supply of the electric power; and the second quick disconnect member is a socket adapter comprising a socket housing and a socket fitting disposed within the socket housing, wherein the gas and electric power are conducted through the socket fitting, and the socket housing insulates the socket adapter from a surrounding environment.

40. The gas control device according to claim 39, further comprising a threaded member disposed adjacent the pin fitting, wherein the threaded member is operable to further secure the gas control device to one of the torch components within the plasma arc torch.

41. The gas control device according to claim 39, wherein the socket housing further comprises a threaded extension that is operable to further secure the gas control device to one of the torch components within the plasma arc torch.

42. The gas control device according to claim 38, wherein:

the first quick disconnect member is a socket adapter comprising a socket housing and a socket fitting disposed within the socket housing, wherein the gas and electric power are conducted through the socket fitting, and the socket housing insulates the socket adapter from a surrounding environment; and the second quick disconnect member is a pin fitting comprising a plurality of resilient fingers defining contact flanges to provide electrical contact for supply of the electric power.

43. The gas control device according to claim 42, further comprising a threaded member disposed adjacent the pin fitting, wherein the threaded member is operable to further secure the gas control device to one of the torch components within the plasma arc torch.

44. The gas control device according to claim 39, wherein the socket housing further comprises a threaded extension that is operable to further secure the gas control device to one of the torch components within the plasma arc torch.

45. A quick disconnect for operable engagement of components that conduct gas and electric power comprising:

a pin fitting; and a socket adapter having radial bores extending from an exterior surface of the socket adapter, wherein the pin fitting is engaged within the socket adapter such that gas and electric power are conducted through the quick disconnect, and wherein the radial bores cause the socket adapter to fracture should an object other than the pin fitting be inadvertently forced into the socket adapter.

46. The quick disconnect according to claim 45, wherein:

the pin fitting further comprises a plurality of resilient fingers defining a proximal end and a plurality of contact flanges disposed at the proximal end of the resilient fingers; and the socket adapter further comprises a socket housing and a socket fitting disposed within the socket housing, wherein the contact flanges engage the socket fitting to provide electrical contact for supply of the electric power.

47. The quick disconnect according to claim 46, wherein the socket housing further comprises a tapered internal shoulder that causes the resilient fingers to deflect radially inward for engagement of the contact flanges with the socket fitting.

48. The quick disconnect according to claim 47, wherein the socket housing further comprises radial bores disposed adjacent the tapered internal shoulder that cause the socket housing to fracture should an object other than the pin fitting be inadvertently forced into the socket adapter.

49. The quick disconnect according to claim 46, wherein the socket fitting defines a distal internal bore such that the contact flanges engage the distal internal bore for the electrical contact.

50. The quick disconnect according to claim 49, wherein the socket adapter further comprises a sleeve disposed within the distal internal bore to limit engagement of the contact flanges with the distal internal bore and to facilitate disengagement of the pin fitting from the socket adapter.

51. The quick disconnect according to claim 46, further comprising a plug disposed on a shoulder formed within the socket fitting, wherein the plug inhibits electrical contact of an object inadvertently inserted within the socket adapter with the socket fitting.

52. The quick disconnect according to claim 46, further comprising an o-ring disposed between the socket housing and the socket fitting to seal the gas.

53. The quick disconnect according to claim 46, further comprising an o-ring disposed between the pin fitting and the socket housing to seal the gas.

54. The quick disconnect according to claim 46, wherein the socket housing further comprises a threaded extension and the quick disconnect further comprises a threaded member, such that when the pin fitting is fully engaged within the socket adapter, the threaded extension threadably engages the threaded member to further the components.

55. The quick disconnect according to claim 46, further comprising a snap ring disposed around the socket fitting to secure the socket fitting within the socket housing.

56. The quick disconnect according to claim 46, wherein the pin fitting defines an internal bore and the socket fitting defines a distal internal bore and a proximal internal bore, wherein the pin fitting internal bore, the distal internal bore, and the proximal internal bore are in fluid communication to conduct the gas through the quick disconnect.

57. A quick disconnect for use in connecting torch components within a plasma arc torch comprising:

a pin fitting comprising a plurality of resilient fingers defining a proximal end;

a plurality of contact flanges disposed at the proximal end of the resilient fingers; and a socket adapter comprising:

a socket housing;

a socket fitting disposed within the socket housing, the socket fitting defining a proximal internal bore and a distal internal bore;

a sleeve disposed within the distal bore of the socket fitting;

a plug disposed between the proximal internal bore and the distal internal bore of the socket fitting; and a snap ring disposed around the socket fitting, the snap ring securing the socket fitting to the socket housing wherein the contact flanges engage the distal internal bore of the socket fitting such that gas and electric power are conducted through the quick disconnect, the sleeve limits engagement of the contact flanges within the distal internal bore and facilitates disengagement of the pin fitting from the socket adapter, the plug inhibits electrical contact of an object inadvertently inserted within the socket adapter with the socket fitting, and the torch components may be quickly assembled and disassembled.

58. A quick disconnect member operable within a quick disconnect for operable engagement of components that conduct gas and electric power comprising:

a pin fitting comprising a plurality of resilient fingers defining contact flanges to provide electrical contact for supply of the electric power and a distal internal bore for supply of the gas, wherein the pin fitting engages an adjacent quick disconnect member such that the components may be quickly assembled and disassembled.

59. The quick disconnect member according to claim 58, further comprising a threaded member disposed adjacent the pin fitting, wherein the threaded member is operable to further secure the components.

60. A quick disconnect member operable within a quick disconnect for operable engagement of components that conduct gas and electric power comprising:

a socket adapter comprising a socket housing having radial bores and a socket fitting disposed within the socket housing, wherein the gas and electric power are conducted through the socket fitting, and the socket housing insulates the socket adapter from a surrounding environment, and wherein the radial bores extend from an exterior of the socket housing and cause the socket housing to fracture should an object other than the quick disconnect member be inadvertently forced into the socket housing.

61. The quick disconnect member according to claim 60, wherein the socket adapter further comprises a sleeve disposed within the socket fitting to limit engagement of and to facilitate removal of an adjacent quick disconnect member.

62. The quick disconnect member according to claim 60, wherein the socket housing further comprises a threaded extension that is operable to further secure the components.

63. A quick disconnect member operable within a quick disconnect for operable engagement of components that conduct gas and electric power comprising:

a socket housing defining a tapered internal shoulder and radial bores disposed adjacent the tapered internal shoulder, wherein the tapered internal shoulder facilitates insertion of an adjacent quick disconnect member and the radial bores cause the socket housing to fracture should an object other than the quick disconnect member be inadvertently forced into the socket housing.

64. The quick disconnect member according to claim 63, wherein the socket housing further comprises a threaded extension to secure the socket housing to the adjacent quick disconnect member.

65. A quick disconnect member operable within a quick disconnect for operable engagement of components that conduct gas and electric power comprising:

a socket fitting defining a distal internal bore and a proximal internal bore, a non-conductive or insulative plug disposed within the socket fitting for inhibiting electrical contact of an object inadvertently inserted within the socket fitting, wherein the internal bores conduct a supply of gas and the distal internal bore provides electrical contact for an adjacent quick disconnect member such that the socket fitting conducts electric power.

66. A modular plasma arc torch comprising:

a plurality of torch components; and a plurality of quick disconnects operatively engaged between the torch components, wherein at least one quick disconnect comprises:

a pin fitting; and a socket adapter, wherein the pin fitting is engaged within the socket adapter such that gas and electric power are conducted through the quick disconnect, and wherein the pin fitting defines a plurality of resilient fingers that engage the socket adapter, wherein the torch components are removably connected through the quick disconnects such that the torch components may be quickly assembled and disassembled.

67. The modular plasma arc torch according to claim 66, wherein the socket adapter defines a plurality of fingers defining undercuts, wherein the pin fitting is engaged within the socket adapter.

68. The modular plasma arc torch according to claim 66, wherein at least one quick disconnect comprises a dual pitch locking connector.

69. The modular plasma arc torch according to claim 66, wherein at least one quick disconnect comprises:

a socket member;

a pin member disposed within the socket member; and a locking ring that secures the pin member to the socket member.

70. The modular plasma arc torch according to claim 69, further comprising:

a socket housing disposed around the socket member; and a pin housing disposed around the pin member, wherein the locking ring secures the pin housing to the socket housing.

71. The modular plasma arc torch according to claim 66, wherein at least one quick disconnect comprises:

a socket;

a canted coil spring disposed within the socket; and a pin, wherein the pin is slidably disposed within the socket and the canted coil spring secures the pin within the socket.

72. A modular plasma arc torch handle comprising:

a first handle half;

a second handle half;

at least one flexible tab disposed on the first handle half; and at least one receptacle disposed on the second handle half, wherein the flexible tab engages the receptacle to secure the first handle half to the second handle half.

73. The modular plasma arc torch according to claim 72, further comprising at least one positioning pin disposed on the first handle half and at least one positioning hole disposed on the second handle half, wherein the positioning pin is disposed within the positioning hole to position the first handle half relative to the second handle half.

74. The modular plasma arc torch according to claim 73, further comprising:

two flexible tabs disposed along an upper periphery of the first handle half;

two receptacles disposed along an upper periphery of the second handle half;

two positioning pins disposed along a lower periphery of the first handle half; and two positioning holes disposed along a lower periphery of the second handle half.

75. A modular plasma arc torch comprising:

a torch head;

a torch lead; and a quick disconnect operatively engaged between the torch head and the torch lead, the quick disconnect comprising:

a pin fitting comprising a plurality of resilient fingers defining a proximal end and a plurality of contact flanges disposed at the proximal end of the resilient fingers; and a socket adapter comprising a socket housing, a socket fitting disposed within the socket housing, and a sleeve disposed within the socket fitting, the sleeve limiting engagement of the contact flanges with the socket fitting and facilitating disengagement of the pin fitting from the socket adapter, wherein the resilient fingers are engaged within the socket fitting such that gas and electric power are conducted through the quick disconnect, and the torch head is removably connected to the torch lead through the quick disconnect such that the torch head and the torch lead may be quickly assembled and disassembled.

76. A modular plasma arc torch comprising:

a torch head;

a torch lead;

a gas control device;

a first quick disconnect operatively engaged between the torch head and the gas control device; and a second quick disconnect operatively engaged between the gas control device and the torch lead, the quick disconnects comprising:

a pin fitting comprising a plurality of resilient fingers defining a proximal end and a plurality of contact flanges disposed at the proximal end of the resilient fingers; and a socket adapter comprising a socket housing, a socket fitting disposed within the socket housing, and a sleeve disposed within the socket fitting, the sleeve limiting engagement of the contact flanges with the socket fitting and facilitating disengagement of the pin fitting from the socket adapter, wherein the resilient fingers are engaged within the socket fitting such that gas and electric power are conducted through the quick disconnect, the torch head is removably connected to the gas control device through the first quick disconnect, and the gas control device is removably connected to the torch lead through the second quick disconnect such that the plasma arc torch may be quickly assembled and disassembled.

77. A method of assembling a plasma arc torch, the method comprising the steps of:

placing a quick disconnect member disposed within a distal end of a torch lead in engagement with a corresponding quick disconnect member disposed within a proximal end of a torch head, and engaging a threaded member disposed on one of the quick disconnect members with a threaded extension on the corresponding quick disconnect member, wherein the torch head is secured to the torch lead and the torch head and the torch lead are quickly assembled.

78. A method of assembling a plasma arc torch, the method comprising the steps of:

placing a quick disconnect member disposed within a distal end of a torch lead in engagement with a corresponding quick disconnect member disposed within a proximal end of a gas control device; and placing a quick disconnect member disposed within a distal end of a gas control device in engagement with a corresponding quick disconnect member disposed within a proximal end of a torch head, wherein the torch head, the torch lead, and the gas control device are quickly assembled.

79. The method according to claim 78, further comprising the step of:

engaging threaded members disposed on the quick disconnect members with threaded extensions on the corresponding quick disconnect members, wherein the torch head is further secured to the gas control device and the gas control device is further secured to the torch lead.

80. A method of disassembling a plasma arc torch, the method comprising the steps of:

disengaging a quick disconnect member disposed within a distal end of a torch lead from engagement with a corresponding quick disconnect member disposed within a proximal end of a torch head, and disengaging a threaded member disposed on one of the quick disconnect members with a threaded extension on the corresponding quick disconnect member prior to disengaging the disconnect member disposed within the distal end of the torch lead from engagement with the corresponding quick disconnect member disposed within the proximal end of the torch head, wherein the torch head and the torch lead are quickly disassembled.

81. A method of disassembling a plasma arc torch, the method comprising the steps of:

disengaging a quick disconnect member disposed within a distal end of a torch lead from engagement with a corresponding quick disconnect member disposed within a proximal end of a gas control device; and disengaging a quick disconnect member disposed within a distal end of a gas control device from engagement with a corresponding quick disconnect member disposed within a proximal end of a torch head, wherein the torch head, the torch lead, and the gas control device are quickly disassembled.

82. The method according to claim 81, further comprising the step of:

disengaging threaded members disposed on the quick disconnect members from threaded extensions on the corresponding quick disconnect members, wherein the torch head is unsecured from the gas control device and the gas control device is unsecured from the torch lead.

* * * * *